(12) United States Patent
Dutta

(10) Patent No.: US 12,537,762 B2
(45) Date of Patent: Jan. 27, 2026

(54) IN-BAND CONTROL PLANE

(71) Applicant: NOKIA SOLUTIONS AND NETWORKS OY, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 175 days.

(21) Appl. No.: 17/460,536

(22) Filed: Aug. 30, 2021

(65) Prior Publication Data

US 2023/0063395 A1 Mar. 2, 2023

(51) Int. Cl.
*H04L 45/50* (2022.01)
*H04L 41/12* (2022.01)
(Continued)

(52) U.S. Cl.
CPC ............ *H04L 45/507* (2013.01); *H04L 41/12* (2013.01); *H04L 45/021* (2013.01); *H04L 45/122* (2013.01)

(58) Field of Classification Search
CPC ..... H04L 45/507; H04L 41/12; H04L 45/021; H04L 45/122; H04L 45/304; H04L 45/306; H04L 45/566; H04L 45/50
See application file for complete search history.

(56) References Cited

U.S. PATENT DOCUMENTS 9,667,537 B2 * 5/2017 Shibata ................ H04L 45/50
11,233,741 B1 * 1/2022 N ....................... H04L 12/4641
(Continued)

FOREIGN PATENT DOCUMENTS

CN   1 816 008       8/2006
CN   1842023 A      10/2006
(Continued)

OTHER PUBLICATIONS

Bidirectional Forwarding Detection (BFD) for MPLS Label Switched Paths (LSPs) (Year: 2010).*
(Continued)

*Primary Examiner* — Brian Whipple
(74) *Attorney, Agent, or Firm* — Tong, Rea, Bentley & Kim, LLC

(57) ABSTRACT

Various example embodiments for supporting an in-band control plane are presented. Various example embodiments for supporting an in-band control plane may be configured to support an in-band control plane in a Multiprotocol Label Switching (MPLS) network. Various example embodiments for supporting an in-band control plane in an MPLS network may be configured to support an in-band control plane in an MPLS network by supporting exchange of control protocol packets of control protocols as MPLS packets, such that the control protocol messaging is in-band along the MPLS data plane itself. Various example embodiments for supporting an in-band control plane in an MPLS network may be configured to support an in-band control plane in an MPLS network by supporting communication of MPLS packets that encapsulate control protocol messages of control protocols with an MPLS label which indicates that the payloads of the MPLS packets carry the control protocol messages of the control protocols.

19 Claims, 19 Drawing Sheets

(51) Int. Cl.
*H04L 45/021* (2022.01)
*H04L 45/122* (2022.01)

(56) References Cited

U.S. PATENT DOCUMENTS

2015/0098356 A1    4/2015   Bhattacharya
2022/0086072 A1*   3/2022   Chou .................. H04L 41/40

FOREIGN PATENT DOCUMENTS

CN    108702328 A      10/2018
CN    111385206 A  *   7/2020   ............. H04L 45/16
CN    115733794 A       3/2023

OTHER PUBLICATIONS

E. Rosen et al., Request for Comments: 3031—Multiprotocol Label Switching Architecture, Jan. 2001, Network Working Group (Year: 2001).*
E. Rosen et al., RFC 3032: MPLS Label Stack Encoding, Jan. 2001, The Internet Society (Year: 2001).*
EP Search Report mailed in corresponding EP Application No. 22190203.4 on Dec. 23, 2022, 20 pages.
Del Regno, "Mandatory Features of Virtual Circuit Connectivity Verification Implementations," Network Working Group, draft-delregnao-pwe3-vccv-mandatory-features-00, Mar. 22, 2010, 8 pages.
Nadeau, "Pseudo Wire Virtual Circuit Connectivity Verification (VCCV)," Network Working Group, draft-ietf-pwe3-vccv-12.txt, Jan. 1, 2007, 51 pages.
Kompella, et al., "Detecting Multiprotocol Label Switched (MPLS) Data-Plane Failures," IETF, RFC 8029, Mar. 2017, 78 pages.
Aggarwal, et al., "Bidirectional Forwarding Detection (BFD) for MPLS Label Switched Paths (LSPs)," IETF, RFC 5884, Jun. 2010, 12 pages.
Rosen, et al., "MPLS Label Stack Encoding," IETF, RFC 3032, Jan. 2001, 23 pages.
Office Action received for corresponding Chinese Application No. 202211048197.7, dated Oct. 15, 2024, 12 pages (9 pages of Office Action and Search Report and 3 pages of translation).
Communication pursuant to Article 94(3) EPC, Application No. 22 190 203.4-1215, Reference No. 56964EP1, dated Feb. 28, 2025, 9 pages.
Second CN Office Action, including Machine Translation, Chinese Patent Application No. 202211048197.7, dated Apr. 12, 2025, 9 pages.

* cited by examiner

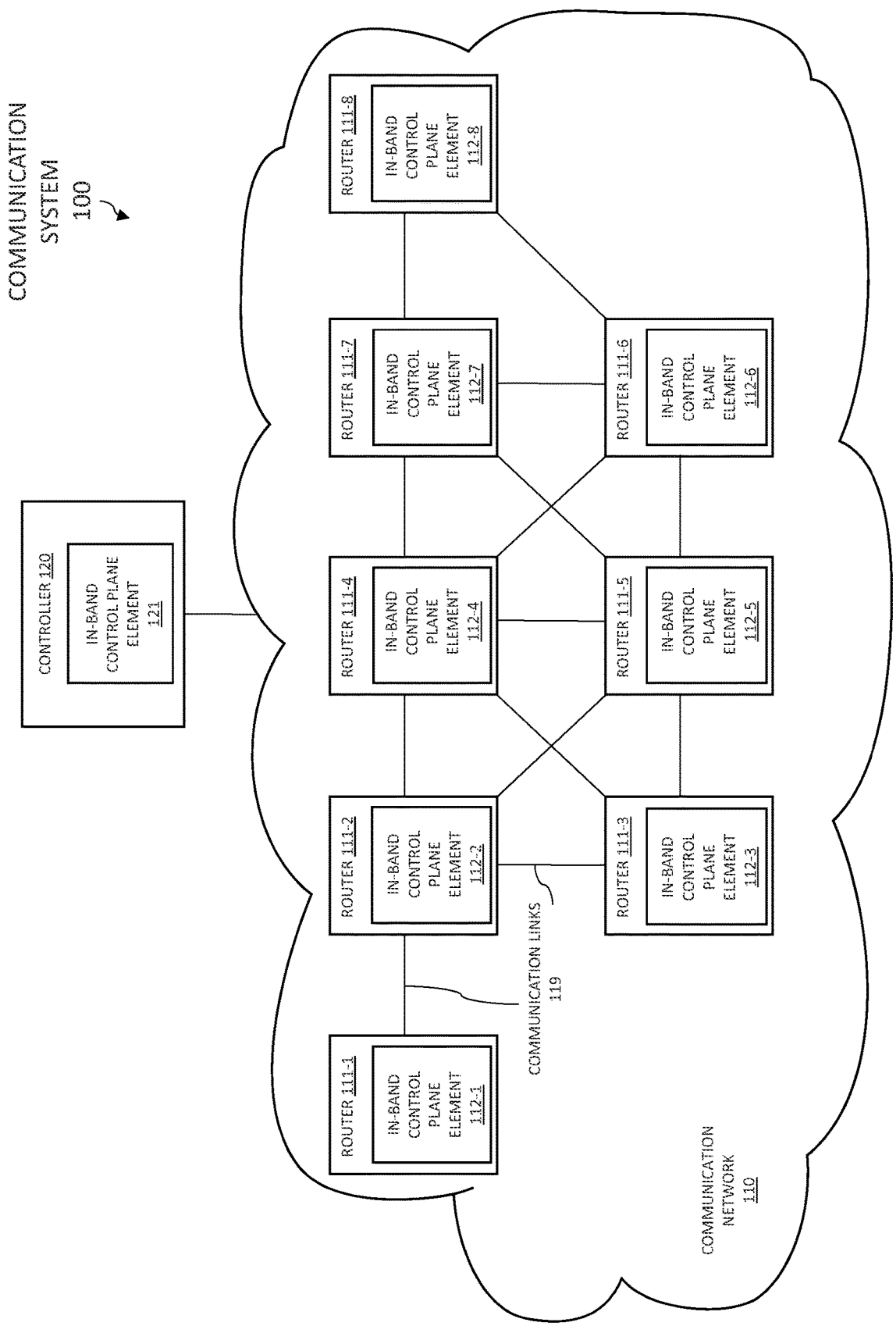

ETHERNET PACKET 600

BRIDGED ETHERNET PACKET 700

FIG. 11

SIGNALING PROTOCOL MESSAGE 1100

| MSG TYPE SPECIFIC DATA |
| MSG TYPE |
| MSG LEN |
| MSG-ID |
| NODE-ID |

# IN-BAND CONTROL PLANE

TECHNICAL FIELD

Various example embodiments relate generally to communication networks and, more particularly but not exclusively, to supporting an in-band control plane in a Multiprotocol Label Switching (MPLS) network.

BACKGROUND

In communication networks, various communications technologies may be used to support various types of communications.

SUMMARY

In at least some example embodiments, an apparatus includes at least one processor and at least one memory including computer program code, wherein the at least one memory and the computer program code are configured to, with the at least one processor, cause the apparatus at least to support communication of a Multiprotocol Label Switching (MPLS) packet including a control message of a network control protocol and a control message label indicative that the MPLS packet includes the control message of the network control protocol, wherein the network control protocol is configured to support a control operation of an MPLS network. In at least some example embodiments, the network control protocol includes a routing protocol configured for topology discovery and path computation in the MPLS network. In at least some example embodiments, the network control protocol includes a signaling protocol configured for setting up label switched paths (LSPs) in the MPLS network. In at least some example embodiments, the network control protocol includes an operations, administration, and maintenance (OAM) protocol configured to support OAM functions in the MPLS network. In at least some example embodiments, the network control protocol is configured to use an addressing scheme to identify a set of network elements of the MPLS network based on a type of the MPLS network. In at least some example embodiments, a label is used as an address to identify one of the network elements of the MPLS network. In at least some example embodiments, the control message label is an MPLS label. In at least some example embodiments, the control message of the network control protocol is encapsulated by the control message label. In at least some example embodiments, the MPLS packet includes a control message field including the control message of the network control protocol. In at least some example embodiments, the control message field includes a protocol type field, a data length field, and a protocol message field including the control message of the network control protocol. In at least some example embodiments, the control message field includes a user data packet, and the data length field is encoded with a value indicative that the control message field includes the user data packet. In at least some example embodiments, the control message of the network control protocol is encoded using a node identifier field, a message identifier field, a message length field, a message type field, and a message data field. In at least some example embodiments, the MPLS packet includes a data packet. In at least some example embodiments, the data packet is configured to trigger setup of a label switched path (LSP) and the control message of the network control protocol is configured for setting up the LSP. In at least some example embodiments, the MPLS packet includes a payload, and the payload includes the control message of the network control protocol and the data packet. In at least some example embodiments, the MPLS packet is encapsulated by a data link layer header. In at least some example embodiments, the MPLS packet includes a router alert label, the control message label encapsulates the control message of the network control protocol, and the router alert label encapsulates the control message label. In at least some example embodiments, the MPLS packet includes an LSP label in a second MPLS network, the control message label encapsulates the control message of the network control protocol, and the LSP label in the second MPLS network encapsulates the LSP label. In at least some example embodiments, the MPLS packet includes a router alert label and an LSP label in a second MPLS network, the control message label encapsulates the control message of the network control protocol, the router alert label encapsulates the control message label, and the LSP label in the second MPLS network encapsulates the router alert label. In at least some example embodiments, the MPLS network includes at least one of an MPLS-based Ethernet bridging network, an MPLS-Transport Profile (MPLS-TP) network, or a Generalized MPLS (GMPLS) network. In at least some example embodiments, to support communication of the MPLS packet, the at least one memory and the computer program code are configured to, with the at least one processor, cause the apparatus at least to obtain, by a node, the control message of the network control protocol and an indication of a destination for the control message of the network control protocol, associate, by the node, the control message label with the control message of the network control protocol to form the MPLS packet, and send, by the node toward the destination for the control message of the network control protocol, the MPLS packet. In at least some example embodiments, to support communication of the MPLS packet, the at least one memory and the computer program code are configured to, with the at least one processor, cause the apparatus at least to receive, by a node, the MPLS packet, determine, by the node based on the control message label, that the MPLS packet includes the control message of the network control protocol, and process, by the node, the control message of the network control protocol.

In at least some example embodiments, a computer readable medium stores computer program code configured to cause an apparatus at least to support communication of a Multiprotocol Label Switching (MPLS) packet including a control message of a network control protocol and a control message label indicative that the MPLS packet includes the control message of the network control protocol, wherein the network control protocol is configured to support a control operation of an MPLS network. In at least some example embodiments, the network control protocol includes a routing protocol configured for topology discovery and path computation in the MPLS network. In at least some example embodiments, the network control protocol includes a signaling protocol configured for setting up label switched paths (LSPs) in the MPLS network. In at least some example embodiments, the network control protocol includes an operations, administration, and maintenance (OAM) protocol configured to support OAM functions in the MPLS network. In at least some example embodiments, the network control protocol is configured to use an addressing scheme to identify a set of network elements of the MPLS network based on a type of the MPLS network. In at least some example embodiments, a label is used as an address to identify one of the network elements of the MPLS network. In at least some example embodiments, the control message label is an MPLS label. In at least some example embodiments, the control message of the network control protocol is encapsulated by the control message label. In at least some example embodiments, the MPLS packet includes a control message field including the control message of the network control protocol. In at least some example embodiments, the control message field includes a protocol type field, a data length field, and a protocol message field including the control message of the network control protocol. In at least some example embodiments, the control message field includes a user data packet, and the data length field is encoded with a value indicative that the control message field includes the user data packet. In at least some example embodiments, the control message of the network control protocol is encoded using a node identifier field, a message identifier field, a message length field, a message type field, and a message data field. In at least some example embodiments, the MPLS packet includes a data packet. In at least some example embodiments, the data packet is configured to trigger setup of a label switched path (LSP) and the control message of the network control protocol is configured for setting up the LSP. In at least some example embodiments, the MPLS packet includes a payload, and the payload includes the control message of the network control protocol and the data packet. In at least some example embodiments, the MPLS packet is encapsulated by a data link layer header. In at least some example embodiments, the MPLS packet includes a router alert label, the control message label encapsulates the control message of the network control protocol, and the router alert label encapsulates the control message label. In at least some example embodiments, the MPLS packet includes an LSP label in a second MPLS network, the control message label encapsulates the control message of the network control protocol, and the LSP label in the second MPLS network encapsulates the LSP label. In at least some example embodiments, the MPLS packet includes a router alert label and an LSP label in a second MPLS network, the control message label encapsulates the control message of the network control protocol, the router alert label encapsulates the control message label, and the LSP label in the second MPLS network encapsulates the router alert label. In at least some example embodiments, the MPLS network includes at least one of an MPLS-based Ethernet bridging network, an MPLS-Transport Profile (MPLS-TP) network, or a Generalized MPLS (GMPLS) network. In at least some example embodiments, to support communication of the MPLS packet, the computer program code is configured to cause the apparatus at least to obtain, by a node, the control message of the network control protocol and an indication of a destination for the control message of the network control protocol, associate, by the node, the control message label with the control message of the network control protocol to form the MPLS packet, and send, by the node toward the destination for the control message of the network control protocol, the MPLS packet. In at least some example embodiments, to support communication of the MPLS packet, the computer program code is configured to cause the apparatus at least to receive, by a node, the MPLS packet, determine, by the node based on the control message label, that the MPLS packet includes the control message of the network control protocol, and process, by the node, the control message of the network control protocol.

In at least some example embodiments, a method includes supporting communication of a Multiprotocol Label Switching (MPLS) packet including a control message of a network control protocol and a control message label indicative that the MPLS packet includes the control message of the network control protocol, wherein the network control protocol is configured to support a control operation of an MPLS network. In at least some example embodiments, the network control protocol includes a routing protocol configured for topology discovery and path computation in the MPLS network. In at least some example embodiments, the network control protocol includes a signaling protocol configured for setting up label switched paths (LSPs) in the MPLS network. In at least some example embodiments, the network control protocol includes an operations, administration, and maintenance (OAM) protocol configured to support OAM functions in the MPLS network. In at least some example embodiments, the network control protocol is configured to use an addressing scheme to identify a set of network elements of the MPLS network based on a type of the MPLS network. In at least some example embodiments, a label is used as an address to identify one of the network elements of the MPLS network. In at least some example embodiments, the control message label is an MPLS label. In at least some example embodiments, the control message of the network control protocol is encapsulated by the control message label. In at least some example embodiments, the MPLS packet includes a control message field including the control message of the network control protocol. In at least some example embodiments, the control message field includes a protocol type field, a data length field, and a protocol message field including the control message of the network control protocol. In at least some example embodiments, the control message field includes a user data packet, and the data length field is encoded with a value indicative that the control message field includes the user data packet. In at least some example embodiments, the control message of the network control protocol is encoded using a node identifier field, a message identifier field, a message length field, a message type field, and a message data field. In at least some example embodiments, the MPLS packet includes a data packet. In at least some example embodiments, the data packet is configured to trigger setup of a label switched path (LSP) and the control message of the network control protocol is configured for setting up the LSP. In at least some example embodiments, the MPLS packet includes a payload, and the payload includes the control message of the network control protocol and the data packet. In at least some example embodiments, the MPLS packet is encapsulated by a data link layer header. In at least some example embodiments, the MPLS packet includes a router alert label, the control message label encapsulates the control message of the network control protocol, and the router alert label encapsulates the control message label. In at least some example embodiments, the MPLS packet includes an LSP label in a second MPLS network, the control message label encapsulates the control message of the network control protocol, and the LSP label in the second MPLS network encapsulates the LSP label. In at least some example embodiments, the MPLS packet includes a router alert label and an LSP label in a second MPLS network, the control message label encapsulates the control message of the network control protocol, the router alert label encapsulates the control message label, and the LSP label in the second MPLS network encapsulates the router alert label. In at least some example embodiments, the MPLS network includes at least one of an MPLS-based Ethernet bridging network, an MPLS-Transport Profile (MPLS-TP) network, or a Generalized MPLS (GMPLS) network. In at least some example embodiments, supporting communication of the MPLS packet includes obtaining, by a node, the control message of the network control protocol and an indication of a destination for the control message of the network control protocol, associating, by the node, the control message label with the control message of the network control protocol to form the MPLS packet, and sending, by the node toward the destination for the control message of the network control protocol, the MPLS packet. In at least some example embodiments, supporting communication of the MPLS packet includes receiving, by a node, the MPLS packet, determining, by the node based on the control message label, that the MPLS packet includes the control message of the network control protocol, and processing, by the node, the control message of the network control protocol.

In at least some example embodiments, an apparatus includes means for supporting communication of a Multiprotocol Label Switching (MPLS) packet including a control message of a network control protocol and a control message label indicative that the MPLS packet includes the control message of the network control protocol, wherein the network control protocol is configured to support a control operation of an MPLS network. In at least some example embodiments, the network control protocol includes a routing protocol configured for topology discovery and path computation in the MPLS network. In at least some example embodiments, the network control protocol includes a signaling protocol configured for setting up label switched paths (LSPs) in the MPLS network. In at least some example embodiments, the network control protocol includes an operations, administration, and maintenance (OAM) protocol configured to support OAM functions in the MPLS network. In at least some example embodiments, the network control protocol is configured to use an addressing scheme to identify a set of network elements of the MPLS network based on a type of the MPLS network. In at least some example embodiments, a label is used as an address to identify one of the network elements of the MPLS network. In at least some example embodiments, the control message label is an MPLS label. In at least some example embodiments, the control message of the network control protocol is encapsulated by the control message label. In at least some example embodiments, the MPLS packet includes a control message field including the control message of the network control protocol. In at least some example embodiments, the control message field includes a protocol type field, a data length field, and a protocol message field including the control message of the network control protocol. In at least some example embodiments, the control message field includes a user data packet, and the data length field is encoded with a value indicative that the control message field includes the user data packet. In at least some example embodiments, the control message of the network control protocol is encoded using a node identifier field, a message identifier field, a message length field, a message type field, and a message data field. In at least some example embodiments, the MPLS packet includes a data packet. In at least some example embodiments, the data packet is configured to trigger setup of a label switched path (LSP) and the control message of the network control protocol is configured for setting up the LSP. In at least some example embodiments, the MPLS packet includes a payload, and the payload includes the control message of the network control protocol and the data packet. In at least some example embodiments, the MPLS packet is encapsulated by a data link layer header. In at least some example embodiments, the MPLS packet includes a router alert label, the control message label encapsulates the control message of the network control protocol, and the router alert label encapsulates the control message label. In at least some example embodiments, the MPLS packet includes an LSP label in a second MPLS network, the control message label encapsulates the control message of the network control protocol, and the LSP label in the second MPLS network encapsulates the LSP label. In at least some example embodiments, the MPLS packet includes a router alert label and an LSP label in a second MPLS network, the control message label encapsulates the control message of the network control protocol, the router alert label encapsulates the control message label, and the LSP label in the second MPLS network encapsulates the router alert label. In at least some example embodiments, the MPLS network includes at least one of an MPLS-based Ethernet bridging network, an MPLS-Transport Profile (MPLS-TP) network, or a Generalized MPLS (GMPLS) network. In at least some example embodiments, the means for supporting communication of the MPLS packet includes means for obtaining, by a node, the control message of the network control protocol and an indication of a destination for the control message of the network control protocol, means for associating, by the node, the control message label with the control message of the network control protocol to form the MPLS packet, and means for sending, by the node toward the destination for the control message of the network control protocol, the MPLS packet. In at least some example embodiments, the means for supporting communication of the MPLS packet includes means for receiving, by a node, the MPLS packet, means for determining, by the node based on the control message label, that the MPLS packet includes the control message of the network control protocol, and means for processing, by the node, the control message of the network control protocol.

BRIEF DESCRIPTION OF THE DRAWINGS

The teachings herein can be readily understood by considering the following detailed description in conjunction with the accompanying drawings, in which:

FIG. 1 depicts an example embodiment of a communication system configured to support an in-band control plane in a Multiprotocol Label Switching (MPLS) network;

FIG. 11 depicts an example embodiment of an encoding of a signaling protocol message of a generic signaling protocol;

To facilitate understanding, identical reference numerals have been used herein, wherever possible, in order to designate identical elements that are common among the various figures.

DETAILED DESCRIPTION

Figure 2C:
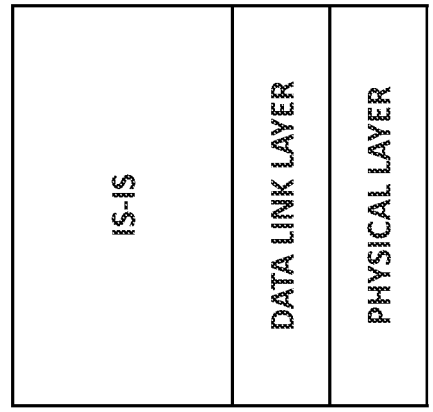
FIGS. 2A-2C depict example embodiments of MPLS signaling protocols within the context of a communications hierarchy.

Various example embodiments for supporting an in-band control plane are presented. Various example embodiments for supporting an in-band control plane may be configured to support an in-band control plane in a Multiprotocol Label Switching (MPLS) network. Various example embodiments for supporting an in-band control plane in an MPLS network may be configured to support an in-band control plane in an MPLS network by supporting exchange of control protocol packets of control protocols as MPLS packets, such that the control protocol messaging is in-band along the MPLS data plane itself. Various example embodiments for supporting an in-band control plane in an MPLS network may be configured to support an in-band control plane in an MPLS network by supporting communication of MPLS packets that encapsulate control protocol messages of control protocols with an MPLS label which indicates that the payloads of the MPLS packets carry the control protocol messages of the control protocols. Various example embodiments for supporting an in-band control plane in an MPLS network may be configured to support an in-band control plane in an MPLS network, based on support for exchange of control protocol packets of various types of control protocols, including network control protocols such as routing protocols configured for topology discovery and path computation in the MPLS network, signaling protocols configured for setting up MPLS label switched paths (LSPs) in the MPLS network, operations, administration, and maintenance (OAM) protocols configured to support OAM functions in the MPLS network, or the like, as well as various combinations thereof. It will be appreciated that these and various other example embodiments and advantages or potential advantages of supporting an in-band control plane may be further understood by way of reference to the various figures, which are discussed further below.

FIG. 1 depicts an example embodiment of a communication system configured to support an in-band control plane in an MPLS network. The communication system 100 includes a communication network 110 and a controller 120. The communication network 110 is a packet-switched network including a set of routers 111-1-111-8 (collectively, routers 111, which are also referred to herein using the notation Rx) and a set of communication links 119 via which the routers 111 are communicatively connected. For example, the communication network 110 may be an MPLS-based network or MPLS-related network. The communication network 110 is configured to support various data plane functions and control plane functions for supporting communication of traffic. The communication network 110 is configured to support in-band MPLS control plane. The communication network 110 is configured to support an in-band MPLS control plane by supporting exchange of control protocol packets of control protocols as MPLS packets, such that the control protocol messaging is in-band along the MPLS data plane itself. The communication network 110 is configured to support an in-band control plane in an MPLS network by supporting communication of MPLS packets that encapsulate control protocol messages of control protocols with an MPLS label which indicates that the payloads of the MPLS packets carry the control protocol messages of the control protocols. The routers 111-1-111-8 include in-band control plane elements 112-1-112-8 (collectively, in-band control plane elements 112), respectively, which are configured to provide various functions for supporting an in-band MPLS control plane. The controller 120 is configured to provide various control functions for the communication network 110 (e.g., maintaining network topology and traffic engineering information, computing source routes for ingress routers in the communication network 110, or the like, as well as various combinations thereof). The controller 120 includes an in-band control plane element 121 configured to support various functions for supporting an in-band MPLS control plane. Various example embodiments for supporting an in-band MPLS control plane within the communication network 110 may be further understood by first considering various aspects of packet switched networks and, more particularly, MPLS-related networks.

Various example embodiments are configured to provide a generic control plane applicable to MPLS networks. Various example embodiments configured to provide a generic control plane applicable to MPLS networks may be further understood by first considering various aspects of MPLS networks.

With MPLS, the first time a packet enters the network, it is assigned to a specific forwarding equivalence class (FEC), which is indicated by appending a label to the packet. Each node in the network has a table indicating how to handle packets of a specific FEC type so that, once the packet has entered the network, nodes do not need to perform header analysis. Instead, subsequent routers use the label as an index into a table that indicates the next-hop, and its associated label, for that packet. This gives the MPLS network the ability to handle packets with particular characteristics (e.g., coming from particular ports, carrying traffic of particular application types, or the like) in a consistent manner. Packets carrying real-time traffic, such as voice or video, can easily be mapped to low-latency routes across the network, something that typically is challenging with conventional routing. In MPLS, the labels provide a way to attach additional information to each packet—information above and beyond information already existing in the nodes which forward the packets.

MPLS does not fit neatly into the Open Systems Interconnection (OSI) model and there has been confusion over whether MPLS is a Layer 2 service or a Layer 3 service. MPLS is sometimes referred to as a Layer 2.5 service. In fact, one of the key benefits of MPLS is that it separates forwarding mechanisms from the underlying data-link service. In other words, MPLS can be used to create forwarding tables for any underlying protocol (thus the term "multi-protocol" in MPLS).

In a layering hierarchy, MPLS may be located between the Data Link Layer and a User Payload, providing an MPLS Layer. More specifically, the Data Link Layer may be disposed adjacent to and above the Physical Layer, the MPLS Layer may be disposed adjacent to and above the Data Link Layer, and the User Payload may be disposed adjacent to and above the MPLS Layer. The MPLS Layer is composed of mechanism for forwarding MPLS packets, which are often referred to as the MPLS Data Plane (e.g., the MPLS Layer in the above hierarchy is the MPLS Data Plane).

In MPLS, MPLS nodes establish a label switched path (LSP), a pre-determined path to route traffic in an MPLS network, based on the criteria in the FEC. MPLS forwarding may then be performed after an LSP has been established. It will be appreciated that LSPs can be unidirectional as well as bi-directional. When an end user sends traffic into the MPLS network, an MPLS label is added to the packets by an ingress MPLS node that sits on the network edge and then the labeled packet (e.g., an MPLS packet) is sent to the next-hop of the LSP. The labeled packet gets forwarded along the path of the LSP by swapping of labels at each transit node until the packet is received by the egress node where the label is popped.

In MPLS, MPLS LSPs may be automatically constructed along a path in an MPLS network by an MPLS signaling protocol. For example, MPLS signaling protocols may include signaling protocols which may run atop Transmission Control Protocol (TCP), which in turn runs atop Internet Protocol (IP), such as Label Distribution Protocol (LDP), Constraint Based LDP (CR-LDP), Border Gateway Protocol (BGP), or other suitable protocols. For example, MPLS signaling protocols may include signaling protocols which run atop IP, such as Resource Reservation Protocol-Traffic Engineering (RSVP-TE), Open Shortest Path First (OSPF), OSPFv3, or other suitable protocols. For example, MPLS signaling protocols may include signaling protocols which may run atop any layer-2 (Data Link Layer) technology between two nodes in the MPLS network, such as Intermediate-System-to-Intermediate-System (IS-IS) or other suitable protocols. It will be appreciated, as discussed further herein, that RSVP-TE and CR-LDP can construct traffic engineered LSPs (TE-LSPs). It will be appreciated that the use of such MPLS signaling protocols in the OSI layering hierarchy may be further understood by way of reference to FIGS. 2A-2C.

Figure 2B:
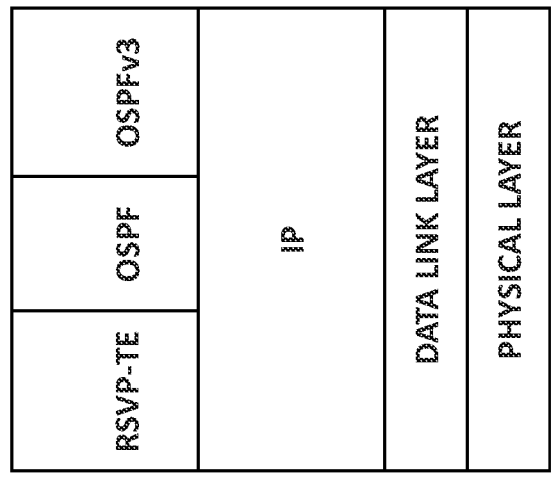
Figure 2A:
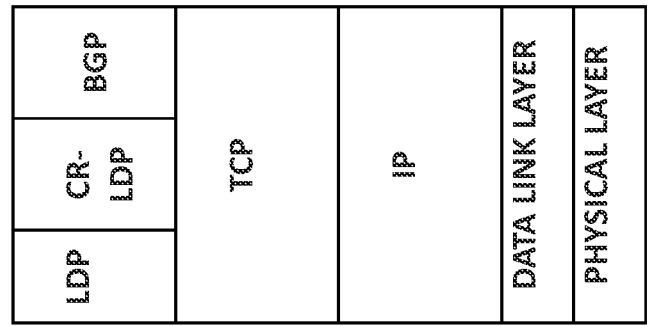

FIGS. 2A-2C depict example embodiments of MPLS signaling protocols within the context of a communications hierarchy.

FIG. 2A depicts an example embodiment illustrating positioning of certain MPLS signaling protocols (namely, signaling protocols which run atop TCP over IP) within the OSI layering hierarchy. As depicted in FIG. 2A, LDP, CR-LDP, and BGP sit atop TCP, which in turn sits atop IP. The example of FIG. 2A illustrates operation of such control protocols out-of-band, such that the control protocols are not using the MPLS data plane. Various example embodiments for supporting an in-band MPLS control plane, that supports operation of such control plane protocols atop MPLS using the MPLS data plane, are presented herein.

FIG. 2B depicts an example embodiment illustrating positions of certain signaling protocols (namely, signaling protocols which run atop IP over the Data Link Layer) within the OSI layering hierarchy. As depicted in FIG. 2B, RSVP-TE, OSPF, and OSPFv3 sit atop IP, which in turn sits atop the Data Link Layer. The example of FIG. 2B illustrates operation of such control protocols out-of-band, such that the control protocols are not using the MPLS data plane. Various example embodiments for supporting an in-band MPLS control plane, that supports operation of such control plane protocols atop MPLS using the MPLS data plane, are presented herein.

FIG. 2C depicts an example embodiment illustrating positions of certain signaling protocols (namely, signaling protocols which run atop the Data Link Layer) within the OSI layering hierarchy. As depicted in FIG. 2C, IS-IS sits atop the Data Link Layer, which in turn sits atop the Physical Layer. The example of FIG. 2C illustrates operation of such control protocols out-of-band, such that the control protocols are not using the MPLS data plane. Various example embodiments for supporting an in-band MPLS control plane, that supports operation of such control plane protocols atop MPLS using the MPLS data plane, are presented herein.

It will be appreciated, as discussed further herein, that use of an in-band MPLS control plane, that supports operation of such control plane protocols (e.g., as presented in FIGS. 2A-2C) atop MPLS, may obviate the need for use of IP to support the MPLS control protocols (although it will be appreciated that IP still may be supported and used for various purposes).

Figure 3:
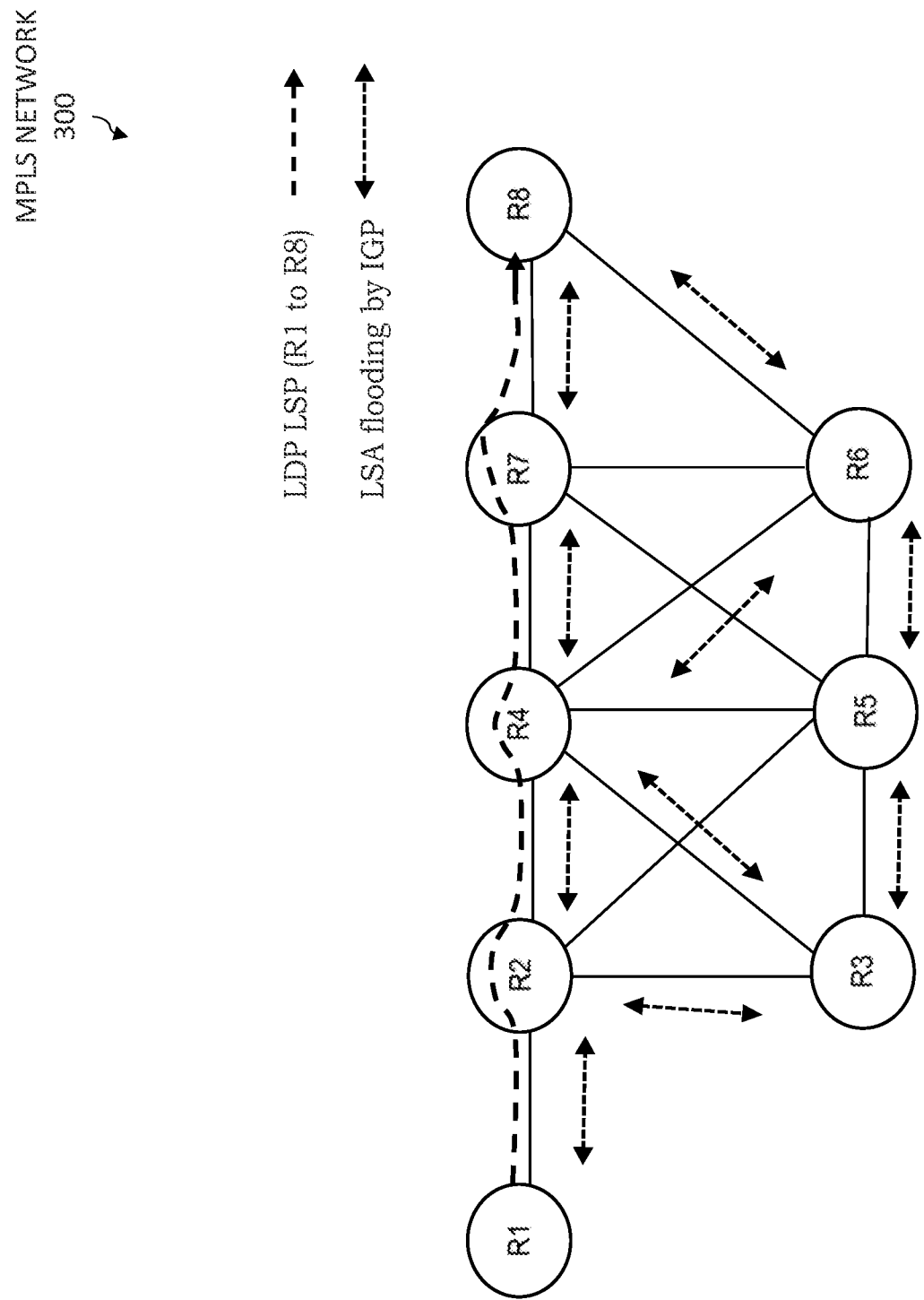
FIG. 3 depicts an example embodiment of an MPLS network for illustrating construction of MPLS LSPs based on LDP.
Figure 4:
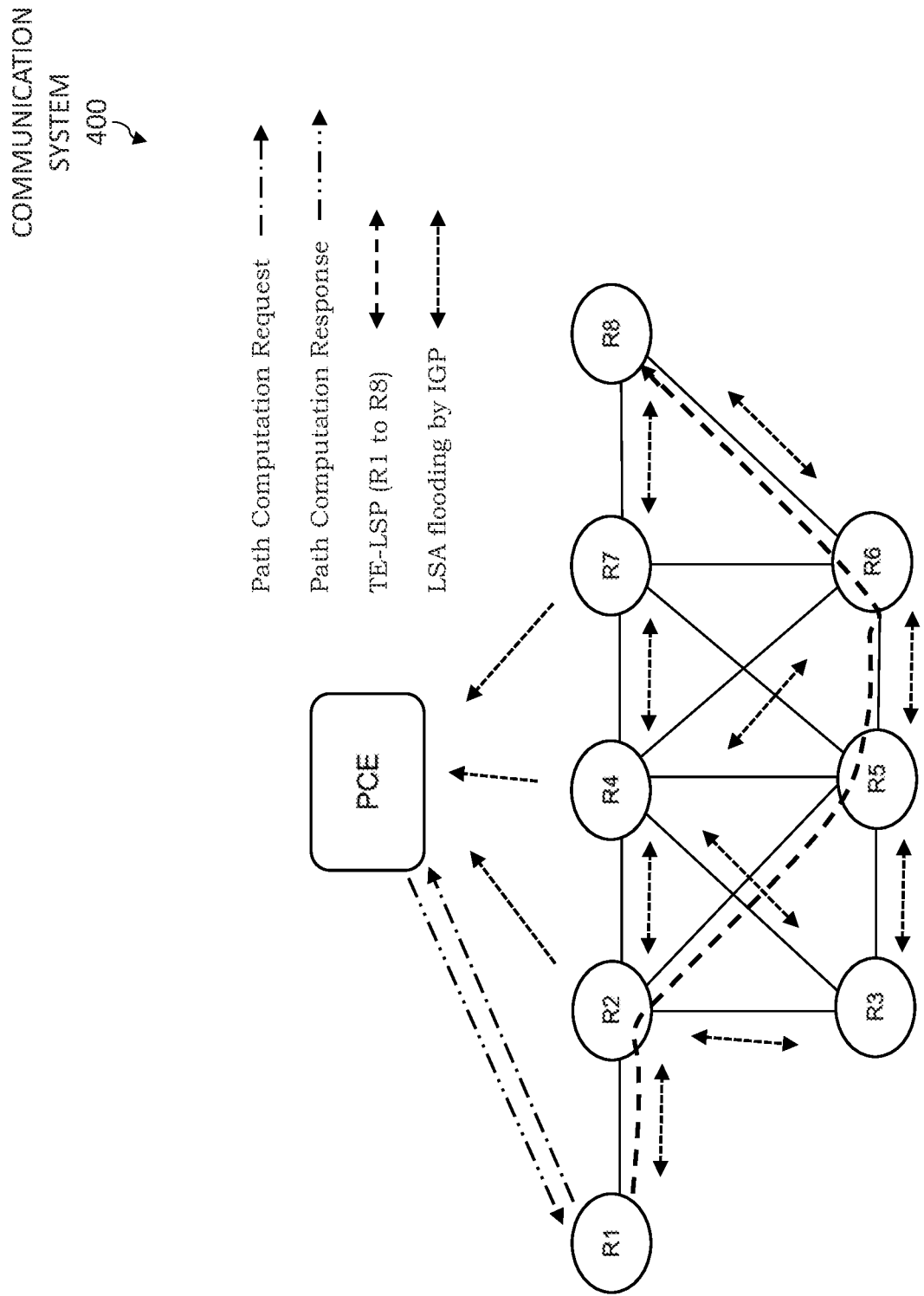
FIG. 4 depicts an example embodiment of a communication system for illustrating construction of MPLS TE-LSPs based on RSVP-TE.

It will be appreciated that at least some such example embodiments for supporting an in-band MPLS control plane may be further understood by way of reference to FIG. 3 (which illustrates construction of MPLS LSPs based on LDP) and FIG. 4 (which illustrates construction of MPLS TE-LSPs based on RSVP-TE).

FIG. 3 depicts an example embodiment of an MPLS network for illustrating construction of MPLS LSPs based on LDP. In FIG. 3, an MPLS network 300 includes nodes R1-R8 which are used to illustrate construction of MPLS LSPs using LDP. In FIG. 3, consider an example for the set-up of an LSP from R1 to R8 using LDP. Each node is configured with at least one loopback IP address. Here, assume that the loopback IP address of node Rx is IP-x. For example, the loopback IP address of R5 is IP-5. The endpoints of the links are assigned IP addresses as well, to provide IP connectivity among the nodes using dynamic routing protocols like the Interior Gateway Protocols (IGPs). Each node is running an IGP which floods its loopback address and state/cost of the directly connected links as Link State Advertisements (LSAs). Each node also floods the LSAs received from neighboring nodes. Through this flooding mechanism, each node receives the LSAs describing the topology of the entire network. From the received LSAs, each node builds an identical topology database of the network. Then, each node computes shortest path to every other node by using a Shortest Path First (SPF) computation (e.g., based on an SPF algorithm such as Djikstra's Algorithm) on its topology database. The computed paths are installed into the IP routing table, which is the basis of IP connectivity among the nodes in the network. For example, assume that the shortest path from R1 to R8 is R1→R2→R4→R7→R8. A discussed further below, it will be appreciated that creation of an LSP on this shortest path from R1 to R8 may be supported using various protocols, such as LDP, OSPF, OSPFv3, and IS-IS.

In LDP, an LSP is uniquely identified in the network by a Forwarding Equivalence Class (FEC). Various FEC Types are possible based on the nature/application of the LSP. In this example, the LDP LSP is identified by a loopback IP address of the destination node of the LSP. So, the FEC of the LSP is the loopback IP address of a destination node.

In LDP, each node creates a FEC for its loopback address and allocates a label for the FEC from its local label space. Then, LDP in the node advertises a label mapping message for the {FEC, Label} to all its neighboring nodes. On receipt of a label mapping message, a node allocates a label for the FEC from its local label space and advertises the label mapping to its neighbors. In this way, each node in the network receives label mappings from its neighbors for the loopback addresses of all other nodes in the network. For example, assume that the label for the loopback IP address IP-x advertised by node A is Lx-A. So, the label for IP-8 advertised by node R8 to nodes R6 and R7 is L8-8. R8 in turn advertises label L8-6 for IP-8 to each of its neighbors, which includes nodes R5, R7, and R8. For a FEC IP-x, a node A chooses the label Lx-B advertised by the shortest path next-hop B of IP-x as the next-hop label and then cross-connects its advertised label Lx-A to the next-hop label Lx-B. So, an MPLS packet received by node A with label Lx-A is swapped with the next-hop label Lx-B and the packet is sent to the next-hop B.

In LDP, in this way, an MPLS LSP is constructed from a node to every other node in the network, where the LSP traverses the IP shortest path to the destination node. For example, R1 receives a label mapping for IP-8 from R2 with label L8-2. So, R1 sends a MPLS packet to R8 with label L8-2. R2 receives a label mapping for IP-8 from R3 with label L8-3, receives a label mapping for IP-8 from R4 with label L8-4, and receives a label mapping for IP-8 from R5 with label L8-5; however, R2 chooses the label L8-4 as the next-hop label since its shortest path next-hop to IP-8 is R4. So, R2 swaps the label L8-2 of the received MPLS packet with label L8-4 and sends the MPLS packet to R4. Eventually, the MPLS packet is delivered along the LSP IP-8 that follows the shortest path R1→R2→R4→R7→R8. Since LDP runs atop TCP, the LDP messages are reliably delivered between the nodes. It is noted that there can be only one LDP signaled LSP per destination since the FEC is the destination IP address. It is further noted that such LSPs may be referred to as best effort LSPs (BE-LSPs) since all traffic to a destination is forwarded on the same LSP irrespective of congestion experienced on the path of the LSP.

It will be appreciated that OSPF, OSPFv3, and IS-IS follow a paradigm similar to LDP to construct MPLS LSPs between the nodes. These IGPs include the label mapping for a loopback address IP-x in the LSA for IP-x. These IGPs have a built-in mechanism for reliable delivery of messages. For example, a receiving node sends back an acknowledgment (Ack) of the receipt of a message to the sender node and, if the sender does not receive an Ack within a predetermined period then the sender retransmits the message.

FIG. 4 depicts an example embodiment of a communication system for illustrating construction of MPLS TE-LSPs based on RSVP-TE. In FIG. 4, a communication system 400 includes nodes R1-R8 and a path computation element (PCE), which are used to illustrate construction of MPLS TE-LSPs based on RSVP-TE. A TE-LSP is constructed to guarantee quality-of-service (QoS) of packet flows transported on the TE-LSP. Typically, the parameters to describe QoS are bandwidth (BW), delay, or the like. Each link in the network is assigned TE metrics such as maximum BW, available BW, delay, color, or the like. Then, an IGP (e.g., OSPF, OSPFv3, IS-IS, or the like) floods the TE metrics of the links across the network using TE-LSAs. From the flooded TE-LSAs, each node builds an identical Traffic Engineering Data Base (TEDB). To set-up a TE-LSP from a first node (ingress of the TE-LSP) to a second node (egress/destination of the TE-LSP), the first block is the computation of an explicit path from the first node to the second node that guarantees the QoS of the TE-LSP. The computation is done by a Constrained Shortest Path First (CSPF) algorithm on the TEDB with the QoS parameters as the constraints. This computation can be done by the first node or can be done by a centralized controller (e.g., a Path Computation Element (PCE) or the like) where the centralized controller listens to the TE-LSAs flooded by the network and builds a centralized TEDB. Once an explicit path is computed, the first node constructs the TE-LSP along the explicit path using RSVP-TE as the signaling protocol. In RSVP-TE, a FEC is composed as {loopback IP address of ingress node, loopback IP address of egress node, Tunnel-ID}. Tunnel-ID is assigned by the ingress node and acts the distinguisher among the TE-LSPs between a pair of nodes. So, there can be multiple TE-LSPs between a pair of nodes, each following a different path.

In FIG. 4, assume that the explicit path computed for a TE-LSP from R1 to R8 is R1→R2→R5→R6→R8. Further assume that R1 allocated Tunnel-ID 100 for the TE-LSP. So, the FEC of the TE-LSP is {IP-8, 100}. R1 initiates an RSVP-TE "Path" message that encodes {FEC, Path={R2→R5, R5→R6, R6→R8}, QoS} and sends the message on link R1→R2, which is the next-hop of the path. R1 also reserves the QoS resources on the link R1→R2 and, as a result, the TE metrics of link R1→R2 get updated. For example, available BW in the link is decremented by the BW reserved by the TE-LSP. On receiving the Path message, R2 creates a state for FEC and looks for the next-hop as the topmost entry in the Path, which is R2→R5. R2 reserves the QoS resources on link R2→R5 and pops the next-hop from the Path. R2 then forwards the Path message {FEC, Path={R5→R6, R6→R8}, QoS} on the R2→R5 link. Following the same process, the Path message eventually reaches the egress node R8, creating states of the TE-LSP along the way. R8 allocates a label of the FEC and sends a "Resv" message to node R6, wherein the Resv message encodes the label mapping {FEC, Label}. When R6 receives the Resv message, it allocates a local label for the FEC and cross connects the local label to the label advertised by R8. R6 sends a Resv message with the label mapping to its upstream node. Following the same process, eventually R1 receives a Resv message from R2, which completes the construction of the TE-LSP. Note that the TE metrics updated along the path (due to reservations made by the TE-LSP) are flooded by the IGPs in TE-LSAs which eventually gets reflected in the TEDB of each node. RSVP-TE is a "soft state" protocol, meaning that the ingress node periodically sends Path message for a TE-LSP to maintain the states of the TE-LSP in the nodes along its path. So, there is no reliable delivery mechanism built into RSVP-TE protocol. CR-LDP operates in a fashion similar to RSVP-TE to set-up TE-LSPs; however, since CR-LDP runs atop TCP, its messages are reliably delivered.

Various example embodiments presented herein are configured to support an in-band MPLS control plane. In MPLS, many of the control plane protocols, which operate out-of-band, are IP-based protocols, generally requiring MPLS networks to implement IP and to support IP connectivity between the nodes. However, there are various types of MPLS networks (e.g., MPLS-enhanced Ethernet bridging networks, MPLS-TP networks, Generalized MPLS (GM-PLS) networks, or the like) where implementation of IP may be out of context, undesirable, difficult, or just not done, thereby making establishment and/or signaling of MPLS LSPs difficult. It will be appreciated that there also are various other MPLS-based networks in which various example embodiments for supporting an in-band MPLS control plane may be applied for improving various control plane functions in MPLS-based networks.

Various example embodiments presented herein are configured to support automatic construction of TE-LSPs in MPLS based on support for an in-band MPLS control plane. MPLS can be deployed in Ethernet bridged networks for enabling advanced features such as traffic engineering (TE) of Ethernet packets. This is a new emerging paradigm, especially for the backbone network in Provider Backbone Bridging (PBB). In PBB, the backbone network builds connectivity among the bridges using Shortest Path Bridging (SPB), where all packets to a destination bridge are forwarded along the shortest path to the destination. An issue with SPB is that all packets to a destination are forwarded along the same path, which can lead to congestion and dropping of packets. The solution is TE in the backbone network of the PBB. To enable TE, Ethernet bridges in the backbone may be enhanced with MPLS switching capabilities. A first bridge can send an Ethernet packet to a second bridge over an MPLS path, i.e., by encapsulating the Ethernet packet by an MPLS label(s) of the path. A bridge further encapsulates the MPLS packet with an additional Ethernet header for forwarding the packet to the directly connected next-hop bridge. An example is presented with respect to FIG. 5.

Figure 5:
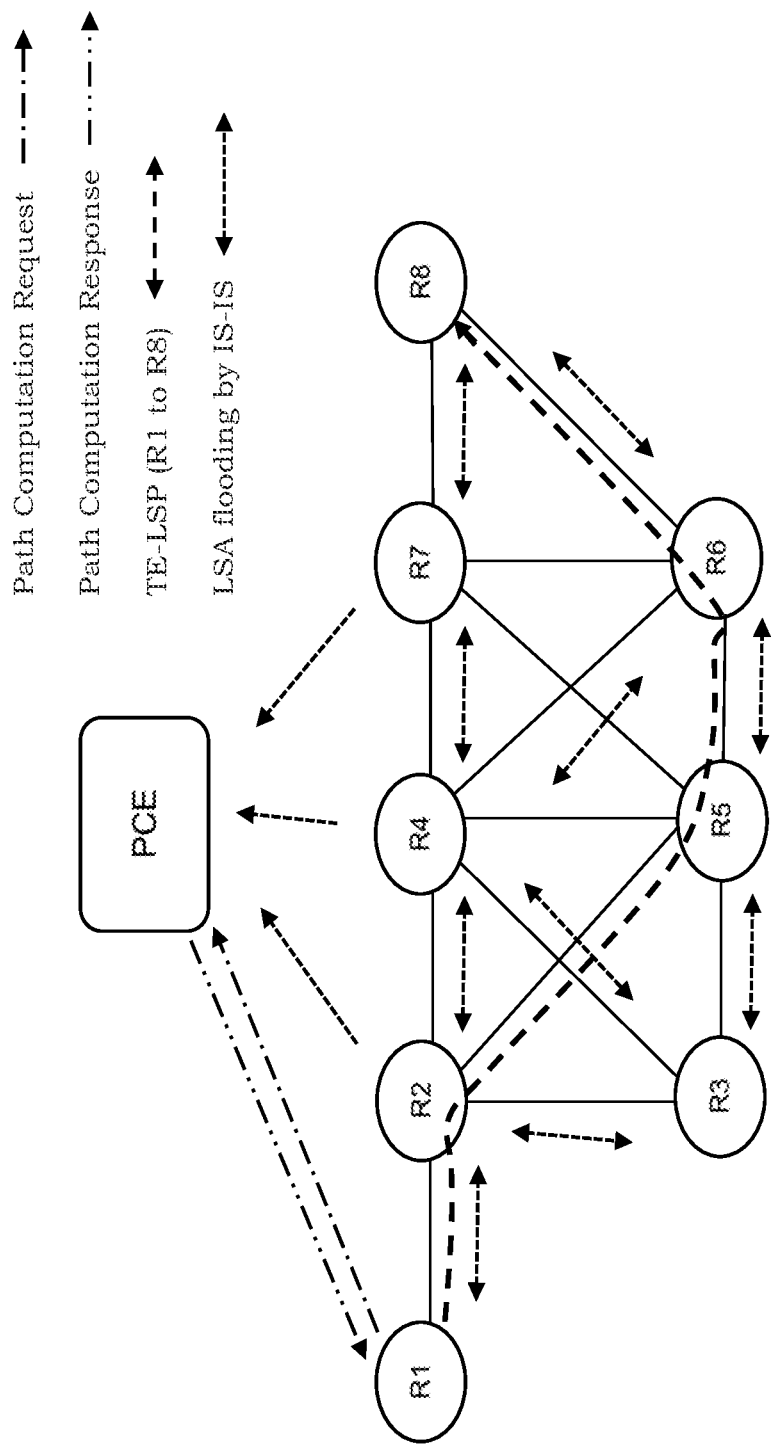
FIG. 5 depicts an example embodiment of a communication system for illustrating use of MPLS to support traffic engineering in a bridged Ethernet network.

FIG. 5 depicts an example embodiment of a communication system for illustrating use of MPLS to support traffic engineering in a bridged Ethernet network. In FIG. 5, a communication system 500 includes nodes R1-R8 and a path computation element (PCE), which are used to illustrate use of MPLS to support traffic engineering in a bridged Ethernet network. In FIG. 5, the nodes R1-R8 are Ethernet bridges. Assume that the MAC address of node Rx is M-x. R1 sends an Ethernet packet P to R8.

In a typical bridging scenario (i.e., without MPLS enhancements), R1 would prepend an Ethernet header (Eth_Hdr) with source MAC address (SMAC) as M-1 and destination MAC address (DMAC) as M-8. The format of an Ethernet packet that is sent across the bridged Ethernet network is illustrated in FIG. 6.

Figure 6:
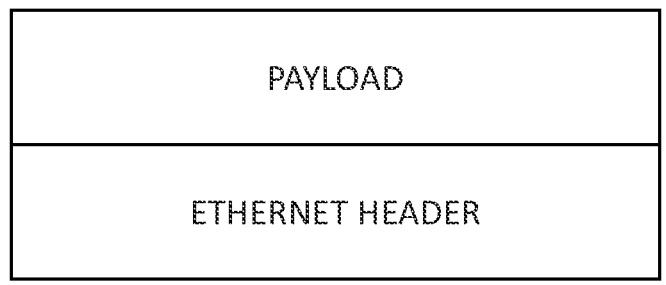
FIG. 6 depicts an example embodiment of an Ethernet packet that is sent on a bridged Ethernet network.

FIG. 6 depicts an example embodiment of an Ethernet packet that is sent on a bridged Ethernet network. The Ethernet packet 600 includes an Ethernet header and a Payload. In the example of FIG. 5, the Ethernet packet {Eth_Hdr={DMAC=M-8, SMAC=M-1}, P} is forwarded along the path R1→R2→R4→R7→R8 by looking up DMAC in the MAC forwarding table of the nodes. The MAC forwarding tables can be built by MAC learning action (e.g., by snooping SMAC of forwarded packets) or by a MAC routing protocol like IS-IS (in SPB). Here, all traffic to a specific destination follows the same path.

In a bridging scenario in which the network of FIG. 5 is enhanced with MPLS capabilities for traffic engineering of Ethernet packets. TE metrics are configured on each link which are flooded across the network as TE-LSAs by IS-IS or another suitable protocol. From the TE-LSAs, each node builds a TEDB. For example, assume that R1 needs to send Ethernet packets to R8 for a certain flow that demands guaranteed QoS. Then, a TE path is computed by running CSPF on the TEDB with QoS as the constraint. For example, assume that the computed path is R1→R2→R5→R6→R8. Then, a TE-LSP is constructed from R1 to R8 to transport the Ethernet packets for the flow. Once the TE-LSP is set-up, Ethernet packets from the flow are transported on the TE-LSP. The format of a packet that is sent on the TE-LSP is illustrated in FIG. 7.

Figure 7:
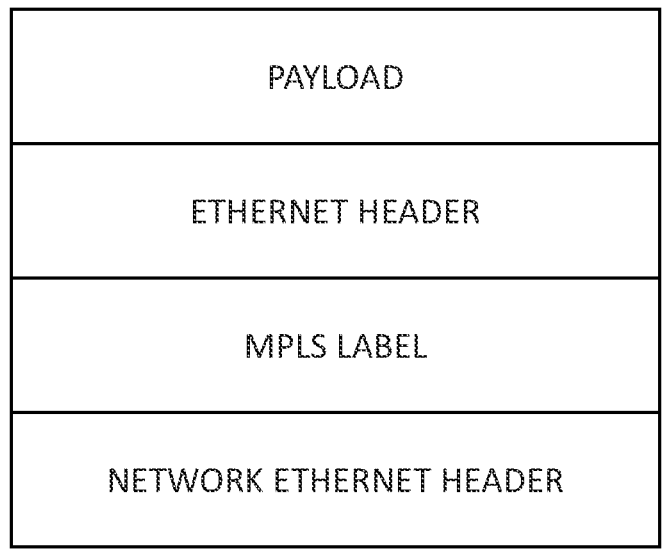
FIG. 7 depicts an example embodiment of a bridged Ethernet packet that is sent on an MPLS TE-LSP on an MPLS-enhanced bridged Ethernet network.

FIG. 7 depicts an example embodiment of a bridged Ethernet packet that is sent on an MPLS TE-LSP. The bridged Ethernet packet 700 includes a Payload, an Ethernet Header on the Payload, an MPLS Label on the Ethernet Header, and a Network Ethernet Header on the MPLS Label. The Payload and Ethernet header are similar to the Ethernet packet of FIG. 6. The Network Ethernet Header is the header used to exchange the MPLS packet between two MPLS nodes.

It is noted that, since Ethernet bridges typically do not implement any higher layer protocols, such as IP, TCP, and so forth, MPLS signaling protocol may not support automatic construction of the TE-LSPs, thereby constraining deployment of MPLS-enhanced Ethernet bridging.

By contrast, as indicated above, an in-band MPLS control plane enables support for automatic construction of TE-LSPs in MPLS—without requiring implementation of IP since the control protocols needed for automatic construction of TE-LSPs in MPLS run directly atop the MPLS data plane.

Various example embodiments presented herein are configured to support automatic construction of LSPs in MPLS-TP based on support for an in-band MPLS control plane. MPLS-TP is a subset of MPLS technology for building packets based transport networks. Packet based transport networks replace traditional transport networks based upon SONET/SDH and other TDM-based technologies. MPLS-TP tunnels provide the transport network service layer over which IP and MPLS traffic is transported. MPLS-TP tunnels provide this functionality through statically provisioned bi-directional LSPs. The MPLS-TP network does not implement IP or may not have IP connectivity. An LSP is statically configured at each node along an explicit path, which can be a tedious process. By contrast, as indicated above, an in-band MPLS control plane enables support for automatic construction of LSPs in MPLS-TP without requiring implementation of IP since the control protocols needed for automatic construction of LSPs in MPLS-TP run directly atop the MPLS data plane.

Various example embodiments presented herein are configured to support topology discovery and LSP setup in GMPLS based on support for an in-band MPLS control plane.

GMPLS generalizes MPLS in that it defines labels for switching various types of layer 1 traffic. Instead of using an explicit label to distinguish an LSP at each LSR, some physical property of the received data stream is used to deduce the LSP to which the data stream belongs. For example, schemes for GMPLS may include using the timeslot to identify the LSP on a Time Division Multiplexed (TDM) link, using the wavelength to identify the LSP on a Wavelength Division Multiplexed (WDM) link, using the fiber or port on which a packet is received, or the like. GMPLS typically uses RSVP-TE for setting up the LSPs and OSPF for topology discovery, each of which relies upon an out-of-band IP control network. GMPLS nodes are layer-1 devices, so implementation of IP for this purpose may be out of the context for such devices. By contrast, as indicated above, an in-band MPLS control plane enables support for topology discovery and LSP setup in GMPLS without requiring implementation of IP since the control protocols needed for topology discovery and LSP setup run directly atop the MPLS data plane.

Various example embodiments may be configured to provide an MPLS control plane that operates directly on the MPLS data plane, since the MPLS data plane is the common denominator in all kinds of MPLS networks. Various example embodiments may be configured to provide an MPLS control plane that operates directly on the MPLS data plane based on exchange of control protocol packets as MPLS packets, such that the control protocol messaging is "in-band" (i.e. along the MPLS data plane itself). The concept of an in-band control plane for MPLS is illustrated in FIG. 8.

Figure 8:
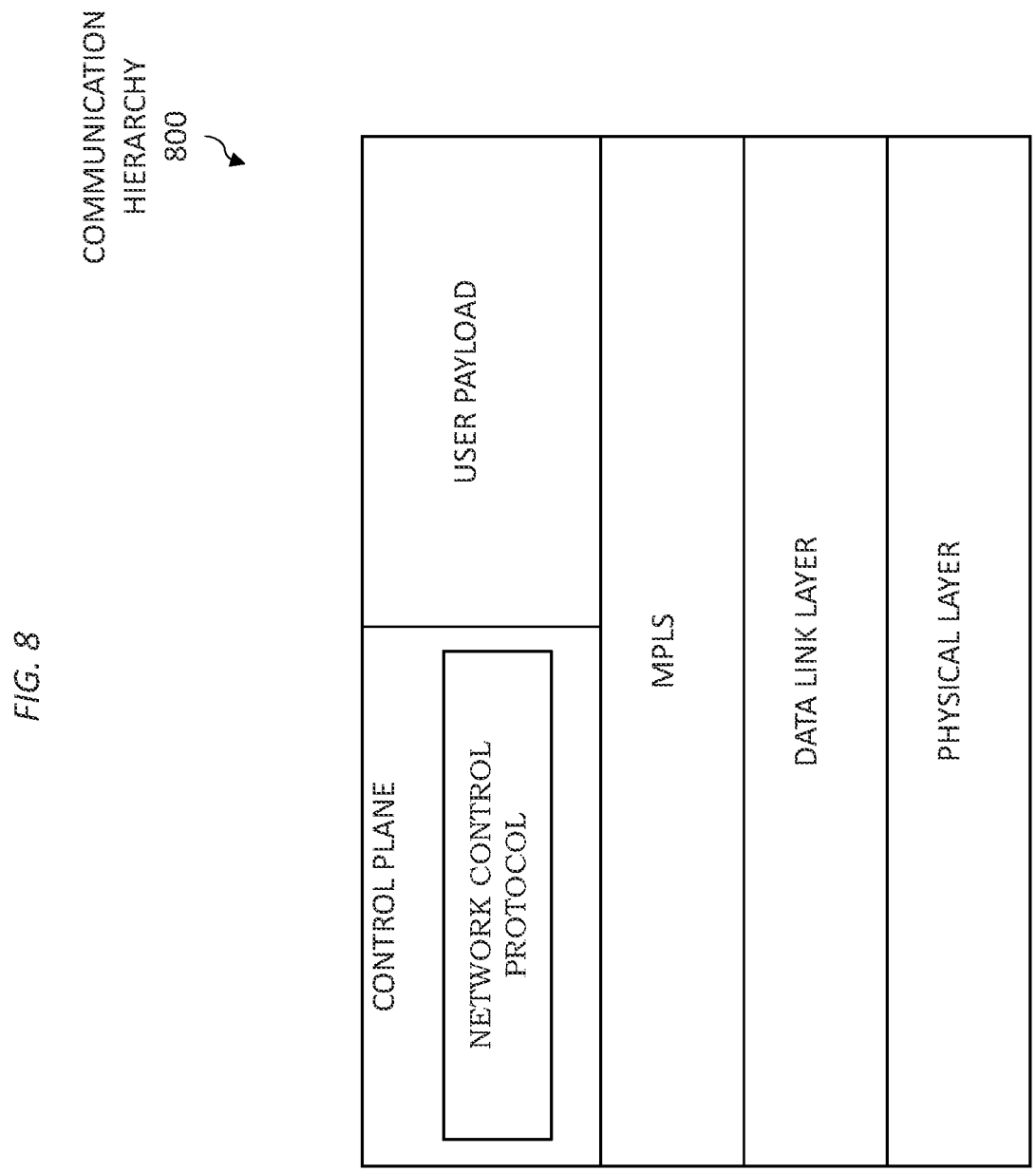
FIG. 8 depicts an example embodiment of an in-band control plane for MPLS presented within the context of a communication hierarchy.

FIG. 8 depicts an example embodiment of an in-band control plane for MPLS presented within the context of a communication hierarchy. As illustrated in the communication hierarchy 800 of FIG. 8, the control plane (which may support various types of control protocols, including, as depicted in FIG. 8, network control protocols such as signaling protocols, routing protocols, OAM protocols, or the like, as well as various combinations thereof) and the user payload plane are at the same layer of the communication hierarchy, immediately above the MPLS layer such that both the control plane and the user payload plane are transported in-band by the MPLS data plane. In this sense, the control plane, and, thus, the associated control protocol messaging, is in-band along the MPLS data plane itself. An example embodiment of an MPLS packet configured to support control protocol messaging in-band within the MPLS data plane is presented in FIG. 9.

Figure 9:
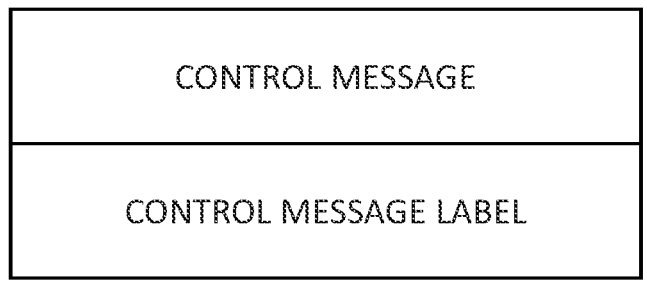
FIG. 9 depicts an example embodiment of an MPLS packet configured to support an in-band control plane for MPLS.

FIG. 9 depicts an example embodiment of an MPLS packet configured to support an in-band control plane for MPLS. The MPLS packet 900 includes a Control Message and a Control Message Label (CML). The CML encapsulates the Control Message, such that the Control Message may be considered to be the payload of the MPLS packet and the Control Message Label may be considered to be a header of the MPLS packet. The CML of the MPLS packet indicates that the payload includes the Control Message. The CML may be an MPLS label or other suitable type of label. The Control Message of the MPLS packet includes a control protocol message of a control protocol, which may be a network control protocol. In this sense, the control protocol message included in the payload of the MPLS packet may be considered to be encapsulated by the CML. It is noted that an MPLS packet having a CML as its outermost label also may be referred to herein as a CML packet or, more generally, Control Message (CM) packet. When a node receives a CML packet the node recognizes, based on the CML of the CML packet, that the CML packet includes a control protocol message in the payload and processes the control protocol message in the payload.

Figure 10:
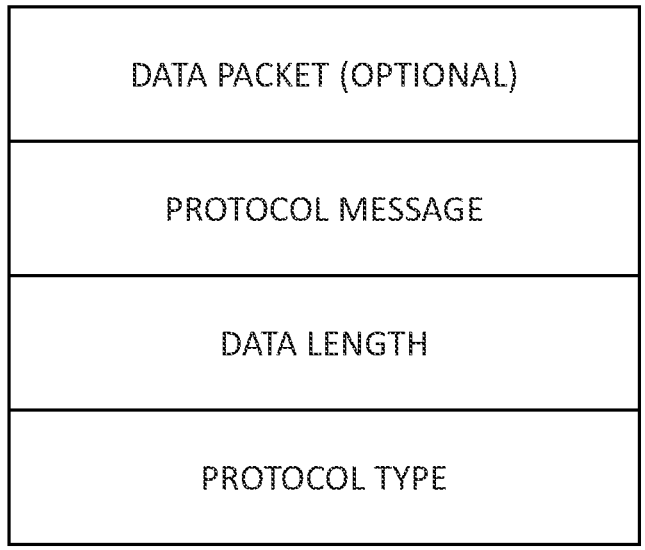
FIG. 10 depicts an example embodiment of a Control Message configured for use in an MPLS packet configured to support an in-band control plane for MPLS.

FIG. 10 depicts an example embodiment of a Control Message configured for use in an MPLS packet configured to support an in-band control plane for MPLS. The Control Message 1000 includes a Protocol Type field, a Data Length field, a Protocol Message field, and, optionally, a Data Packet.

The Protocol Type field encodes the type of the specific control protocol of the control protocol message included within the Control Message 1000. The control protocol may be a signaling protocol for set-up of LSPs, a routing protocol for routing along LSPs, or the like. It is noted that a control protocol may use an addressing scheme "native" to the MPLS network. For example, in the case of an Ethernet bridging network as in FIG. 5, the MAC addresses of the nodes or links may be used. For example, in case of MPLS-TP, an addressing scheme suitable for a transport network may be used. For example, in case of GMPLS, an addressing scheme suitable for the layer-1 network may be used. It will be appreciated that, irrespective of the type of network, a label itself can be used as an address for a network element. The label space used for addresses can be different from the label spaces used for the states of the MPLS LSPs. For example, a global label space can be used to allocate addresses for network elements and a local label space per node can be used for allocation of labels for the LSPs.

The Data Length field indicates the size of the Data Packet piggybacked to the Control Message. If value of this field is 0, then it means that no Data Packet is included in the Control Message.

The Protocol Message is the message of the control protocol indicated by Protocol Type field. It will be appreciated that the encoding of the message is dependent on the control protocol.

The optional Data Packet field may be used to transport a user data packet, which enables the user data packet to be piggybacked on the Control Message. This may be used when the user data packet has triggered set-up of a LSP. In that case, the user data packet may ride on a control message that sets up the LSP along a specified path. So, transmission of the first data packet and construction of LSP is a concomitant operation. When the CML packet is received by the egress node (which means set-up of the LSP is complete), the egress node extracts the user data packet from the CML packet and delivers the user data packet to its destination based on its native header. Subsequent user data packets are sent as regular MPLS packets along the LSP.

FIG. 11 depicts an example embodiment of an encoding of a signaling protocol message of a generic signaling protocol. The signaling protocol message 1100 is configured for use as a Protocol Message in the Control Message of FIG. 10. The signaling protocol message 1100 is encoded as {Node-ID, Msg-ID, Msg Len, Msg Type, Msg Type Specific Data}. The 'Node-ID' encodes the network wide unique identifier/address of the sender node. It is noted that, in at least some embodiments, the Node-ID may referred to as LSR-ID, i.e., an identifier of the Label Switching Router (LSR). The 'Msg-ID' encodes a unique identifier of the message assigned by the sender. The 'Msg Len' indicates the length of the message. The 'Msg Type' indicates the type of control message followed by type specific data (Msg Type Specific Data').

Various control message types may be supported. For example, as discussed further below, the control message types that are supported may include a Neighbor Discovery message (e.g., Type 1), a Label Mapping message (e.g., Type 2), a Label Request message (e.g., Type 3), a Label Withdraw message (e.g., Type 4), a Label Release message (e.g., Type 5), an Acknowledgment message (e.g. Type 6), a Notification (e.g., Type 7), or the like, as well as various combinations thereof.

Type 1=Neighbor Discovery (ND). This message is used for discovering neighboring nodes on a link. A first node periodically transmits an ND message on a link. When a second node receives the ND message on that link, the second forms an adjacency with the first node. An ND message is encoded as {Node-ID, Msg-ID, Msg Len, Type=1, Hold-Time}, where 'Hold-Time' is the maximum time (e.g., in seconds) for which the sender node maintains an adjacency with a neighbor without receipt of another ND message from the neighbor.

Type 2=Label Mapping. This message is used to distribute a label assigned to a FEC. The message is encoded as {Node-ID, Msg-ID, Msg Len, Type=2, FEC, Label-Type, Label, <Req-Msg-ID>}. TEC' encodes the FEC/Identifier of the LSP. 'Label' is the label assigned to the FEC and 'Label-Type' indicates whether the Label is upsteam assigned label (UAL) or downstream assigned label (DAL). Req-Msg-ID is an optional parameter, which is included if the label mapping is sent by a node as response to a label request from a neighbor (see Type 3=Label Request below). In that case, Req-Msg-ID encodes the Msg-ID of the Label Request.

Type 3=Label Request. This message is used to request a neighbor for a label mapping of a FEC. The message is encoded as {Node-ID, Msg-ID, Msg Len, Type=3, FEC, <list_of_hops[ ]>, <QoS>}, where list_of_hops[ ] is an optional parameter that encodes an ordered list_of_hops in the path of the LSP. When a node receives a Label Request for a FEC and the node does not have a label mapping for the FEC then the node forwards the Label Request to a next-hop of the FEC. When list_of_hops[ ] is present, the next-hop of the FEC is designated next-hop in list_of_hops [ ].

Type 4=Label Withdraw. This message is used for withdrawal of a label mapping sent by a node to its neighbor. The message is encoded as {Node-ID, Msg-ID, Msg Len, Type=4, FEC, <list_of_hops[ ]>}, where list_of_hops[ ] is an optional parameter that encodes an ordered list_of_hops in the path of the LSP. When a node receives a Label Request for a FEC and the node does not have label mapping for the FEC, then the node forwards the Label Request to next-hop of the FEC. When list_of_hops[ ] is present, the next-hop of the FEC is designated next-hop in list_of_hops [ ].

Type 5=Label Release. This message is used to notify a neighbor of releasing a label mapping received from the neighbor. Typically, Label Release is sent as response to a label withdraw received from neighbor (see Type 4=Label Withdraw below). A node may also send an unsolicited Label Release to a neighbor. The message is encoded as {Node-ID, Msg-ID, Msg Len, Type=5, FEC, Label-Type, Label}.

Type 6=Acknowledgement (Ack). This message is used to acknowledge a neighbor of the receipt of a message from neighbor. This messages ensures reliable delivery of message types 2-5 between neighbors. An Ack message is encoded as {Node-ID, Msg-ID, Msg Len, Type=6, Ack-Msg-ID}. Ack-Msg-ID encodes the Msg-ID of the message being acknowledged.

Type 7=Notification. This message is used to notify a neighbor of an error or a failure. This message is encoded as {Node-ID, Msg-ID, Msg Len, Type=7, Error-Code, <Error-Code-Specific-Data>} where Error-Code indicates the specific error and optional Error-Code-Specific-Data encodes detailed information related to the error. If the error is due to processing of a message then Error-Code-Specific-Data may also encode relevant fields of the message. For example, if a node fails to address a Label Request received from a neighbor then it sends a Notification message with Error-Code="Label Request Fail", and the FEC and Msg-ID fields from the Label Request message in the Error-Code-Specific-Data.

It will be appreciated that the Ack message may be used to support reliable delivery of other control message types. Since ND messages are sent out by a node periodically, reliable delivery is not needed (although it will be appreciated that Ack messages could be used to support reliable delivery of ND messages). Message types 2-5 may be delivered using reliable delivery (e.g., a sender of these message types may retransmit the message to a neighbor if an Ack message is not received from the neighbor within a predefined time).

The construction of a TE-LSP using an in-band MPLS control protocol may be further understood by considering an example based on the MPLS enhanced Ethernet bridging network of FIG. 5.

In this example, in the network, Node-ID in a control message is encoded as the MAC address of the sender node of the message. For topology discovery, IS-IS may be used or an in-band routing protocol using the concepts of an in-band control protocol as presented herein may be implemented. Each bridge periodically sends ND messages on each directly connected link.

An ND message is encapsulated with a CML. When a bridge receives an MPLS packet with a CML as the topmost label, the bridge removes the label and processes the payload as a control message. When the bridge finds an ND message in the control message, the bridge forms an adjacency with the Node-ID (MAC address) encoded in the message. As a result, each bridge forms an adjacency with all neighboring bridges. For example, R4 forms adjacency with R2, R5, and R7.

In this example, bridge R1 constructs a TE-LSP to bridge R8 via the explicit path R1→R2→R5→R6→R8. The FEC of a TE-LSP is encoded as {MAC address of ingress bridge, MAC address of egress bridge, Tunnel-ID}. For example, the Tunnel-ID for the exemplary TE-LSP is 100. So, the FEC of the exemplary TE-LSP is {M-1, M-8, 100}. R1 initiates a Label Request message encoded as {Node-ID=M-1, Msg-ID=10, Msg Len, Type=3, FEC={M-1, M-8, 100}, list_of_hops[ ]={R2→R5, R5→R6, R6→R8}, QoS}. R1 encapsulates the message with a CML and the resultant CML packet is sent on the R1→R2 link. R1 starts a timer to retransmit the message, if R1 does not receive an Ack message from R2 confirming its receipt within a certain period, retransmits the message.

In this example, when R2 receives an MPLS packet with a CML as the topmost label, R2 removes the label and processes the payload as a control message. When R2 finds the above Label Request message in the payload, R2 sends an Ack message to R1, which is encoded as {Node-ID=M-2, Msg-ID=2, Msg Len, Type=6, Ack-Msg-ID=10}. R2 pops the topmost entry in the list_of_hops[ ], which is R2→R5 and determines it as the next-hop. Then, R2 reserves the QoS on R2→R5. If the QoS reservation fails then R2 sends a Notification message to R1 indicating the failure to process the Label Request, otherwise R2 creates a state for FEC={M-1, M-8, 100} and sends a Label Request message on R2→R5. The Label Request message is encoded as {Node-ID=M-2, Msg-ID=5, Msg Len, Type=3, FEC={M-1, M-8, 100}, list_of_hops[ ]={R5→R6, R6→R8}, QoS}. In this way, the Label Request traverses through the path and the state of the FEC gets created on R5, R6, and R8.

In this example, when R8 receives the Label Request message from R6, R8 sends an Ack message to R6 to notify receipt of the Label Request Message. R8 finds, from the FEC in the Label Request message, that it is the egress node. R8 creates the state of the FEC and allocates a local label Lx for the FEC. It programs the state of label into the data plane as the egress. Then, R8 sends a Label Mapping message to R6 on R8→R6 link. The Label Mapping message is encoded as {Node-ID=M-8, Msg-ID=2, Msg Len, Type=2, FEC={M-1, M-8, 100}, Label-Type, Label=Lx, <Req-Msg-ID>}.

In this example, when R6 receives the Label Mapping message from R8, R6 sends an Ack message to R8 to notify receipt of the Label Mapping message. R6 finds the state for the FEC encoded in the Label Mapping message. R6 allocates a local label Ly for the FEC and programs into the data plane for swapping with Lx and forwarding on R6→R8 link. Then, R6 sends a Label mapping message to R5, which is encoded as {Node-ID=M-6, Msg-ID=20, Msg Len, Type=2, FEC={M-1, M-8, 100}, Label-Type, Label=Ly, <Req-Msg-ID>}. In this way, the Label Mapping traverses the reverse path until it reaches R1. When R1 receives the Label Mapping message, the construction of the TE-LSP is complete and R1 can start sending Ethernet packets on the LSP.

It will be appreciated that, although primarily described with respect to an example in which the control protocol that is implemented as an in-band control protocol is a signaling protocol for construction of LSPs, the control protocol that is implemented as an in-band control protocol may be any other suitable type of control protocol (e.g., a control protocol for topology discovery for use in computation of paths for LSPs, a control protocol for computation of paths for LSPs, a control protocol for topology discovery and computation of paths for LSPs, or the like, as well as various combinations thereof).

It will be appreciated that, although primarily presented with respect to example embodiments in which specific control message types are used and defined in a particular manner, the control messages described above may be defined in various other ways, various other control message types may be supported, or the like, as well as various combinations thereof.

It will be appreciated that, although primarily presented with respect to example embodiments in which certain control protocols or types of control protocols are modified to operate in-band, various control protocols (e.g., RSVP, RSVP-TE, or the like) that may are configured to operate with addressing schemes native to an MPLS network or that may be modified to operate with addressing schemes native to an MPLS network may be configured to operate in-band based on various example embodiments presented herein.

Figure 12:
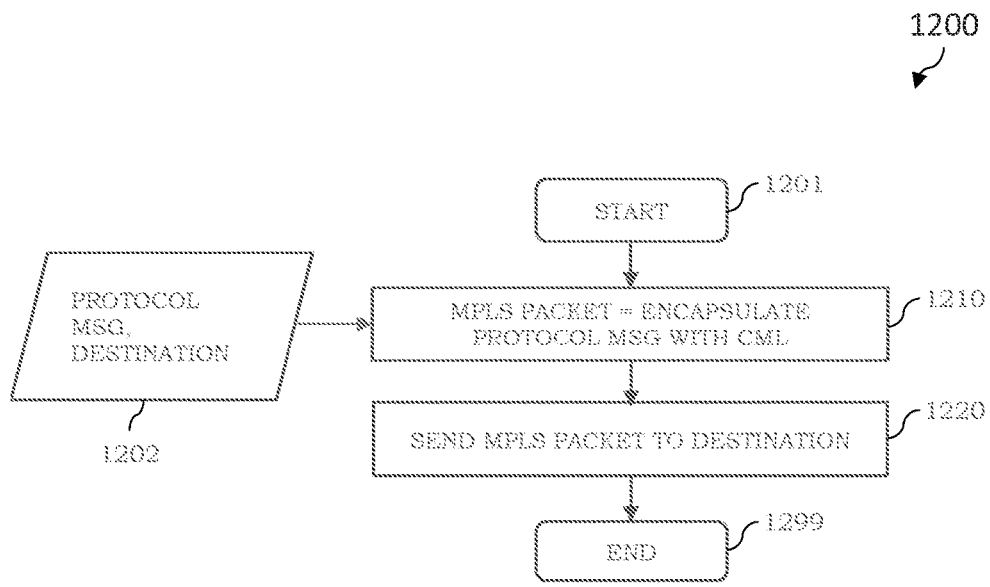
FIG. 12 depicts an example embodiment of a method for use by a node to originate an in-band control protocol message.

FIG. 12 depicts an example embodiment of a method for use by a node to originate an in-band control protocol message. At block 1201, the method 1200 begins. The inputs 1202 to the method 1200 include (1) Protocol Msg, which is the protocol message to be transmitted (e.g., the message of a generic signaling protocol described in FIG. 11) and (2) Destination, which provide an identification of a neighbor or a group of neighbors. Block 1210 encapsulates the protocol message with CML, resulting in a MPLS packet, and the method 1200 then proceeds to block 1220. Block 1220 sends the MPLS packet to the destination, and the method 1200 then proceeds to block 1299 where the method 1200 ends. At block 1299, the method 1200 ends.

Figure 13:
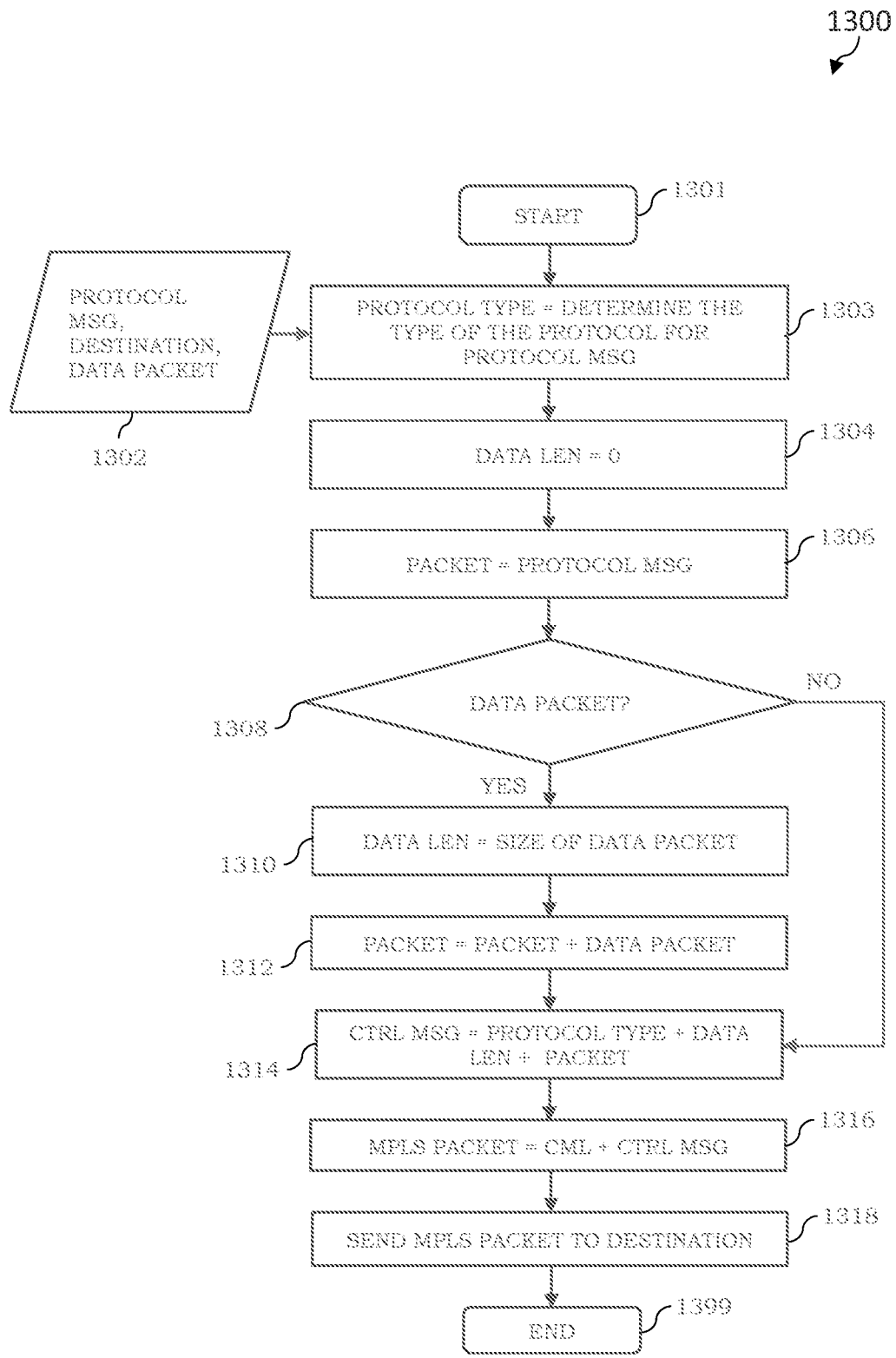
FIG. 13 depicts an example embodiment of a method for use by a node to originate an in-band control protocol message.

FIG. 13 depicts an example embodiment of a method for use by a node to originate an in-band control protocol message. It will be appreciated that the blocks 1303-4316 of the method 1300 of FIG. 13 may be used to implement the function of the block 1210 in FIG. 12. At block 1301, the method 1300 begins. The inputs 1302 to the method 1300 include (1) Protocol Msg, which is the protocol message to be transmitted (e.g., the message of a generic signaling protocol described in FIG. 11), (2) Destination, which provides an identification of a neighbor or a group of neighbors, and (3) Data Packet (from user), an optional parameter, which is included if the Data Packet is to be piggybacked with the Protocol Msg. Block 1303 determines the protocol type to which the protocol message belongs and stores the value into a local variable 'Protocol Type', and the method 1300 then proceeds to block 1304. Block 1304 initializes a local variable 'Data Len' to 0, and the method 1300 then proceeds to block 1306. Block 1306 makes the protocol message as the body of the packet to be transmitted, and the method 1300 proceeds to block 1308. Block 1308 checks if a Data Packet is to be piggybacked onto the packet. If a Data Packet is to be piggybacked onto the packet then the method 1300 proceeds to block 1310, otherwise the method 1300 proceeds to block 1314. Block 1310 sets the value of Data Len by the size of the Data Packet, and the method 1300 then proceeds to block 1312. Block 1312 appends the Data Packet onto the packet and the method 1300 then proceeds to block 1314. Block 1314 prepends Data Len and Protocol Type onto the packet, which results in a Control Message, and the method 1300 then proceeds to block 1316. Block 1316 pushes CML onto the Control Message, which results in the final MPLS packet to be transmitted, and the method 1300 then proceeds to block 1318. Block 1318 sends the MPLS packet to the destination. This block may include pushing the data link header for the destination onto the MPLS packet and transmission on the data link layer. At block 1399, the method 1300 ends.

Figure 14:
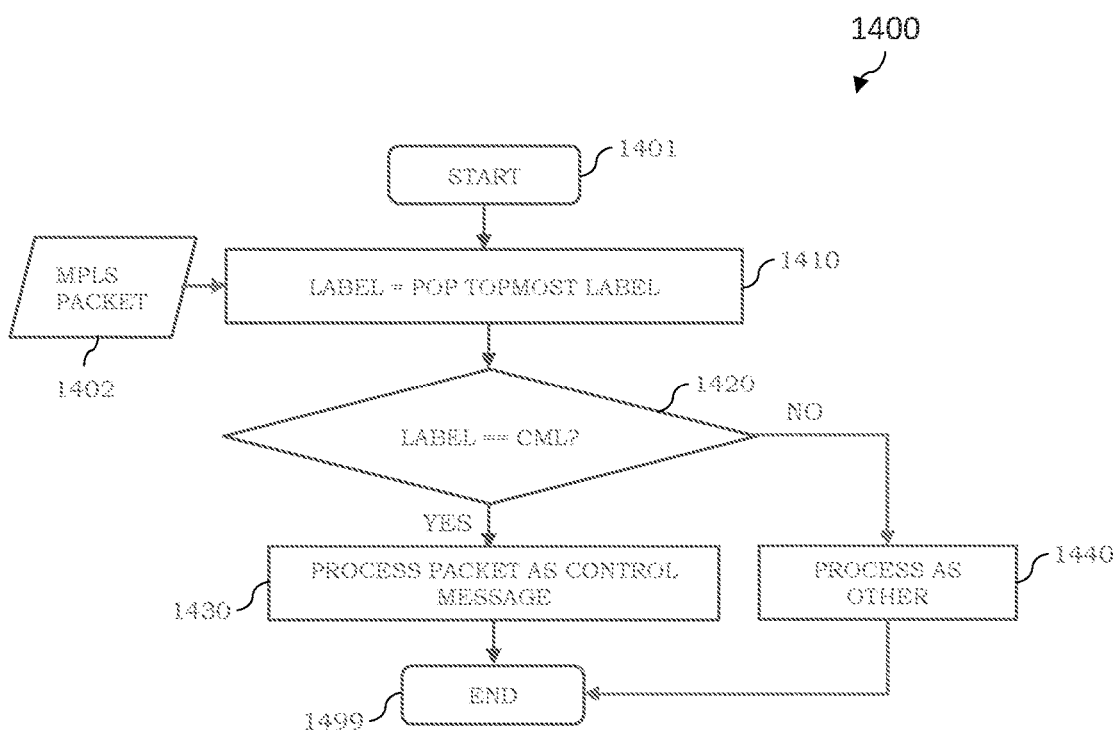
FIG. 14 depicts an example embodiment of a method for use by a node to process an in-band control protocol message.

FIG. 14 depicts an example embodiment of a method for use by a node to process an in-band control protocol message. At block 1401, the method 1400 begins. The input 1402 to the method. 1400 is an MPLS packet received by the node. Block 1410 pops the topmost label of the packet, and the method 1400 then proceeds to block 1420. Block 1420 checks if the popped label is CML. If the popped label is not CML then the method 1400 proceeds to block 1440, otherwise the method 1400 proceeds to block 1430. Block 1440 processes the payload in the context of the popped label other and the method 1400 then proceeds to block 1499 where the method 1400 ends. Block 1430 processes the payload as Control Message and the method 1400 then proceeds to block 1499 where the method 1400 ends. At block 1499, the method 1400 ends.

Figure 15:
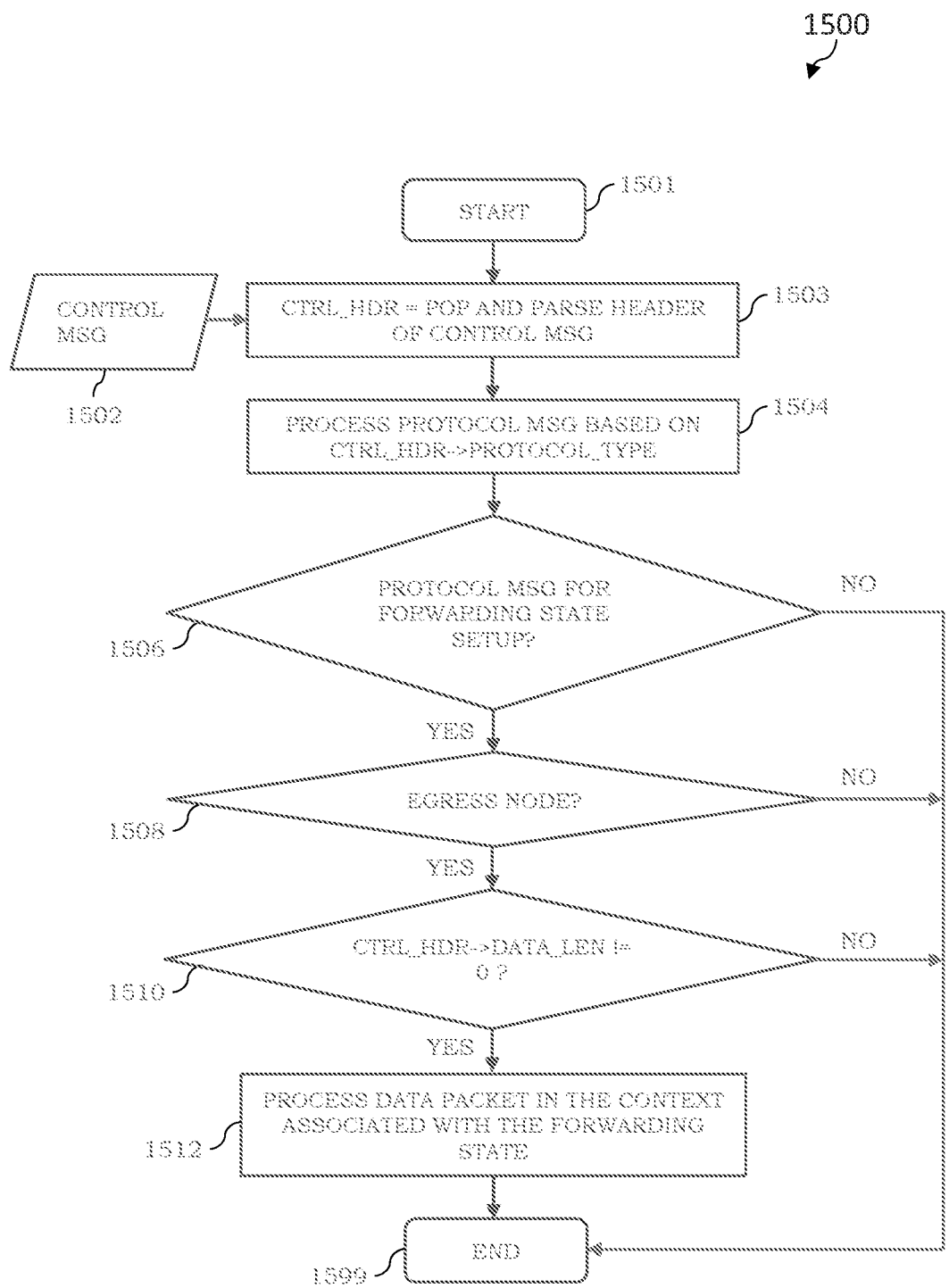
FIG. 15 depicts an example embodiment of a method for use by a node to process a control protocol message.

FIG. 15 depicts an example embodiment of a method for use by a node to process a control protocol message. It will be appreciated that the method 1500 of FIG. 15 may be used to implement the function of the block 1430 in FIG. 14. At block 1501, the method 1500 begins. The input 1502 to the method 1500 is a control message. Block 1503 pops and parses the header of the control message, and the method 1500 then proceeds to block 1504. Block 1504 processes the protocol message based on the protocol type field in the header, and the method 1500 then proceeds to block 1506. Block 1506 checks if the protocol message is for setting up a forwarding state (e.g., LSP if the protocol is a signaling protocol). If the protocol message is not for setting up a forwarding state then the method 1500 proceeds to block 1599 where the method 1500 ends, otherwise the method 1500 proceeds to block 1508. Block 1508 checks if this node is the egress node for the LSP. If this node is not the egress node for the LSP then the method proceeds to block 1599 where the method 1500 ends, otherwise the method proceeds to block 1510. Block 1510 checks if the value of the data length field in control message header is non-zero, which indicates if a data packet is piggybacked onto the control message. If a data packet is piggybacked onto the control message then the method 1500 proceeds to block 1512, otherwise the method 1500 proceeds to block 1599 where the method 1500 ends. Block 1512 processes and forwards the data packet in the context associated with the forwarding state, and the method 1500 then proceeds to block 1599 where the method 1500 ends. At block 1599, the method 1500 ends.

Various example embodiments may be further understood by considering various MPLS packet formats as discussed further below.

Figure 16:
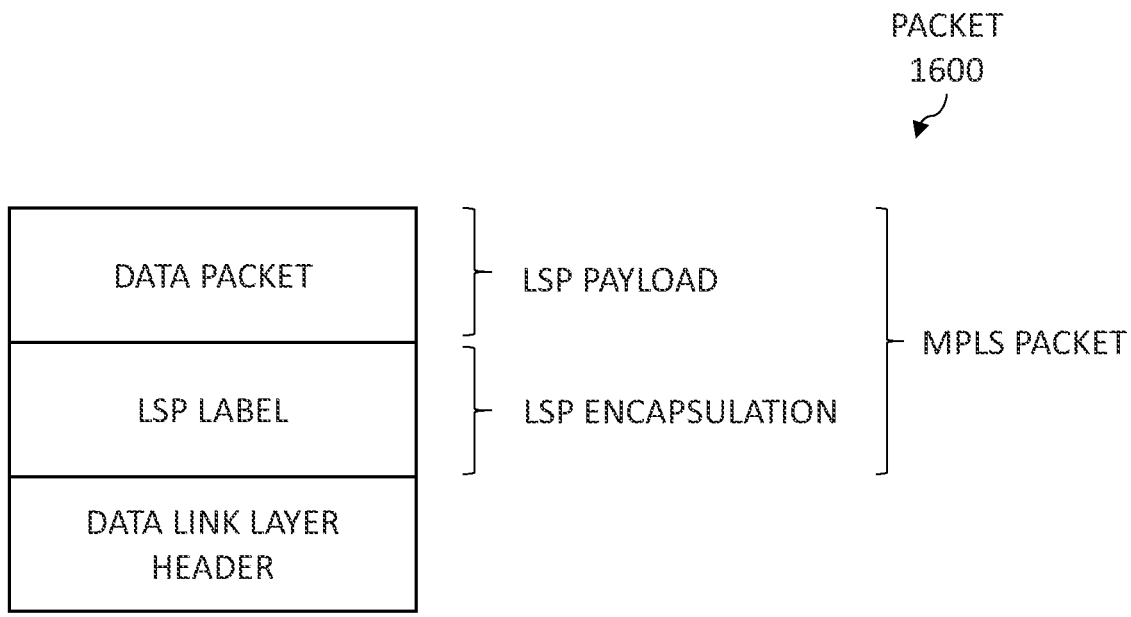
FIG. 16 depicts an example embodiment of a packet including an MPLS packet carrying a data packet to be sent over an MPLS LSP.

FIG. 16 depicts an example embodiment of a packet including an MPLS packet carrying a data packet to be sent over an MPLS LSP. In FIG. 16, the packet 1600 includes a Data Packet, an LSP Label, and a Data Link Layer Header. In the packet 1600 of FIG. 16, the Data Packet is encapsulated by an LSP Label. The MPLS packet is sent to the next-hop MPLS node by encapsulating the MPLS packet with the data link layer header for the link to the next-hop. The LSP Label is switched at each transit node of the LSP until the packet reaches the egress node of the LSP. The egress node pops the LSP Label and forwards the Data Packet (LSP Payload) based on the native headers in the Data Packet (e.g., Ethernet, IP, or the like). It will be appreciated that various OAM techniques may be used to test the data plane of an MPLS LSP.

LSP Ping/Trace (RFC 8029) is an OAM technique to test the data plane of an MPLS LSP from its ingress node to the egress node, for a sanity check before sending Data Packets on the LSP or to isolate failures when the control plane of the LSP is fine but traffic is not passing through the LSP. To test the data plane of the MPLS LSP, the OAM packets are sent on the LSP similar to the Data Packets in FIG. 16, i.e., the OAM packets should experience the same forwarding treatment in ingress/transit/egress nodes as the Data Packets. However, the egress node needs to be able to distinguish that the LSP Payload is not a regular Data Packet (and so should not be forwarded), but, rather is an OAM packet which needs to be handled by the OAM module in the egress node to respond to the ingress node with an appropriate reply. If the OAM packet is of type LSP Trace then the ingress node sends a series of MPLS packets with TTL values 1, 2, 3 . . . respectively in the LSP label so that the TTL expires at every subsequent transit node. When the TTL of a MPLS packet expires at a transit node then it drops the packet (e.g., may be the packet looped), but if it is a OAM packet then the transit node should not drop the packet, but rather, the packet should be handled by the OAM module in the node, which in turn responds to the ingress node with the appropriate reply.

Bi-directional Forwarding Detection is another OAM protocol which is extended for liveliness detection of MPLS LSPs. It is described in RFC 5884. BFD packets are periodically transmitted on the LSP for liveliness detection.

Figure 17:
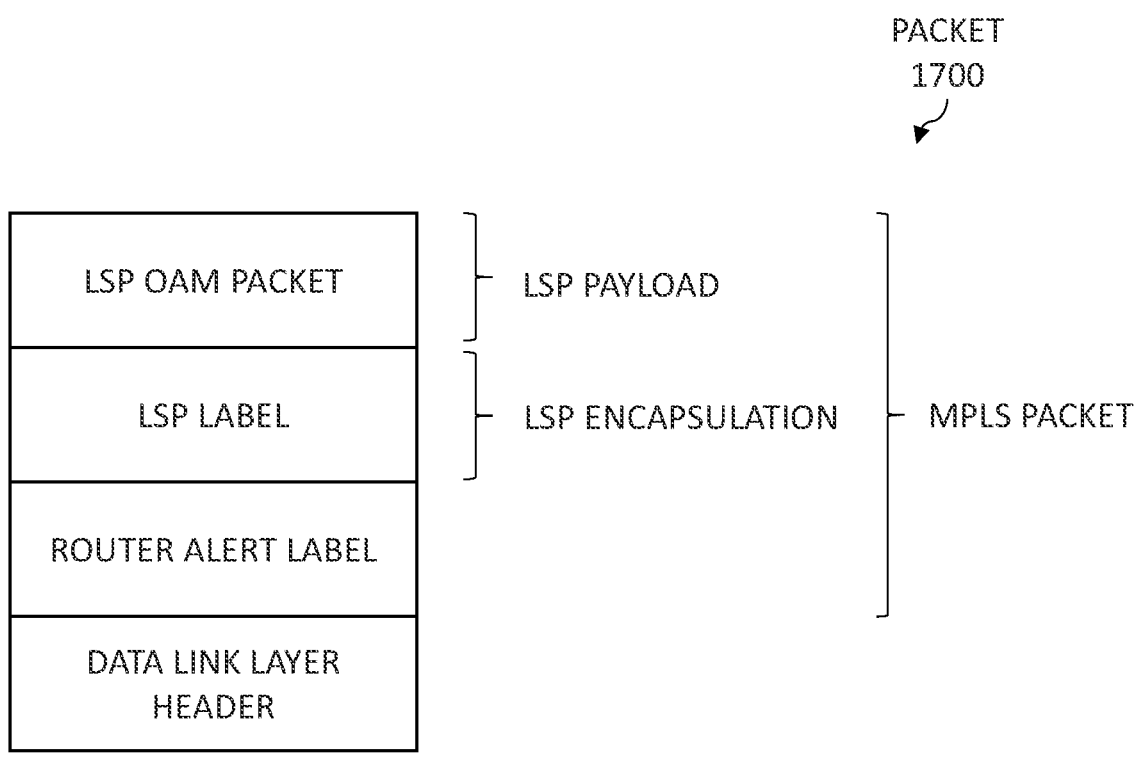
FIG. 17 depicts an example embodiment of a packet including an MPLS packet carrying a LSP OAM packet to be sent over an MPLS LSP.

FIG. 17 depicts an example embodiment of a packet including an MPLS packet carrying a LSP OAM packet to be sent over an MPLS LSP. In FIG. 17, the packet 1700 includes an LSP OAM Packet, an LSP Label, a Router Alert Label, and a Data Link Layer Header. In order to distinguish the LSP OAM Packet in FIG. 17 from regular Data Packets (in FIG. 16), one method encapsulates the LSP Label by a Router Alert Label (RAL), which indicates that the packet needs to be intercepted by the receiving node. The RAL is defined in RFC 3032 with the following encoding rule. A value of 1 represents the "Router Alert Label" and this label value is legal anywhere in the label stack except at the bottom. When a received packet contains this label value at the top of the label stack, it is delivered to a local software module for processing. The actual forwarding of the packet is determined by the label beneath it in the stack. However, if the packet is forwarded further, the Router Alert Label should be pushed back onto the label stack before forwarding. The use of this label is analogous to the use of the "Router Alert Option" in IP packets. Since this label cannot occur at the bottom of the stack, it is not associated with a particular network layer protocol. The RAL can be considered a sort of control label or control channel label, which indicates a control channel on the LSP. The LSP Payload needs to be processed by the receiving node. Then the node looks for the LSP Label beneath the RAL and processes the LSP Payload as an LSP OAM Packet in the context of the LSP Label. The node may further forward the LSP OAM Packet on the LSP after pushing the RAL atop the LSP label. The LSP OAM Packet is an IP packet for both LSP Ping/Trace and BFD Packets. The Protocol Type in the IP header further distinguishes LSP Ping/Trace vs BFD. Both LSP Ping/Trace and BFD encode the control plane identification of the LSP being tested, along with a host of other LSP specific info. So, the scope of the LSP OAM Protocol is the MPLS LSP being tested.

Figure 18:
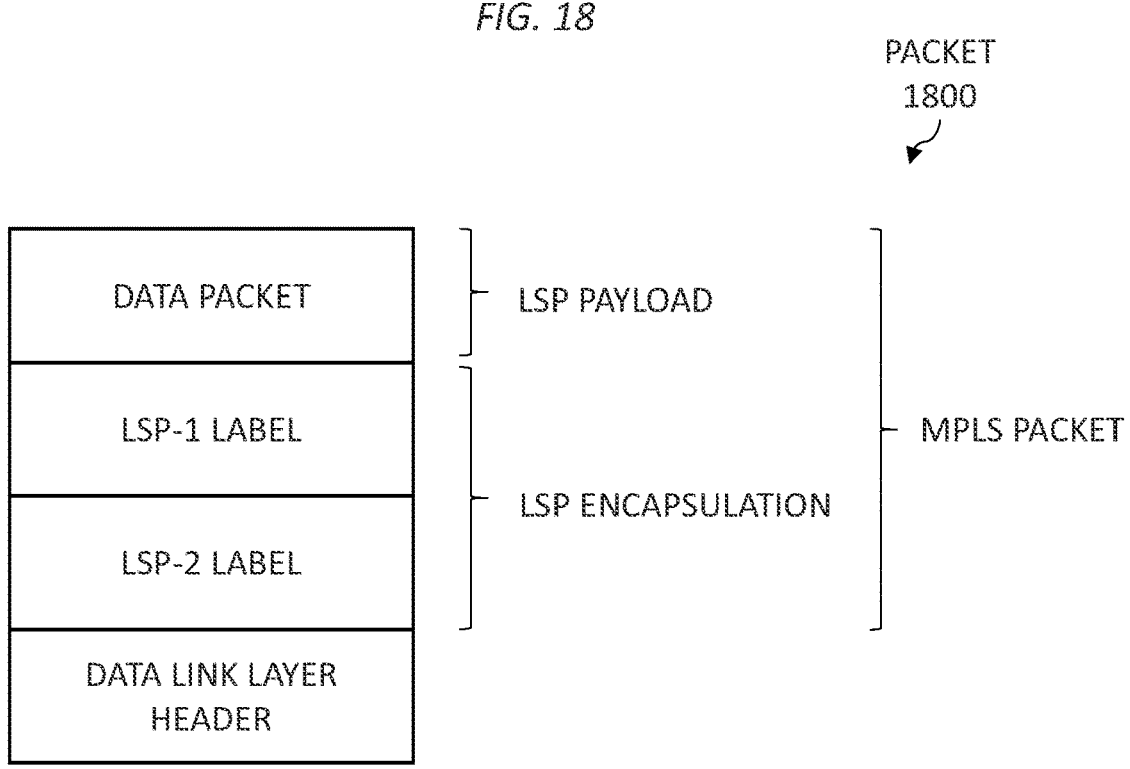
FIG. 18 depicts an example embodiment of a packet including an MPLS packet carrying a data packet to be sent over an MPLS LSP-in-LSP.

FIG. 18 depicts an example embodiment of a packet including an MPLS packet carrying a data packet to be sent over an MPLS LSP-in-LSP. In FIG. 18, the packet 1800 includes a Data Packet, an LSP-1 Label, an LSP-2 Label, and a Data Link Layer Header. In FIG. 18, the first LSP, LSP-1, is overlaid atop a second LSP, LSP-2. The neighboring nodes of LSP-1 are indirectly connected by LSP-2. So, the LSP-1 label is transparently shipped over LSP-2 until the next hop of LSP-1 (which is also an egress node of LSP-2).

Figure 19:
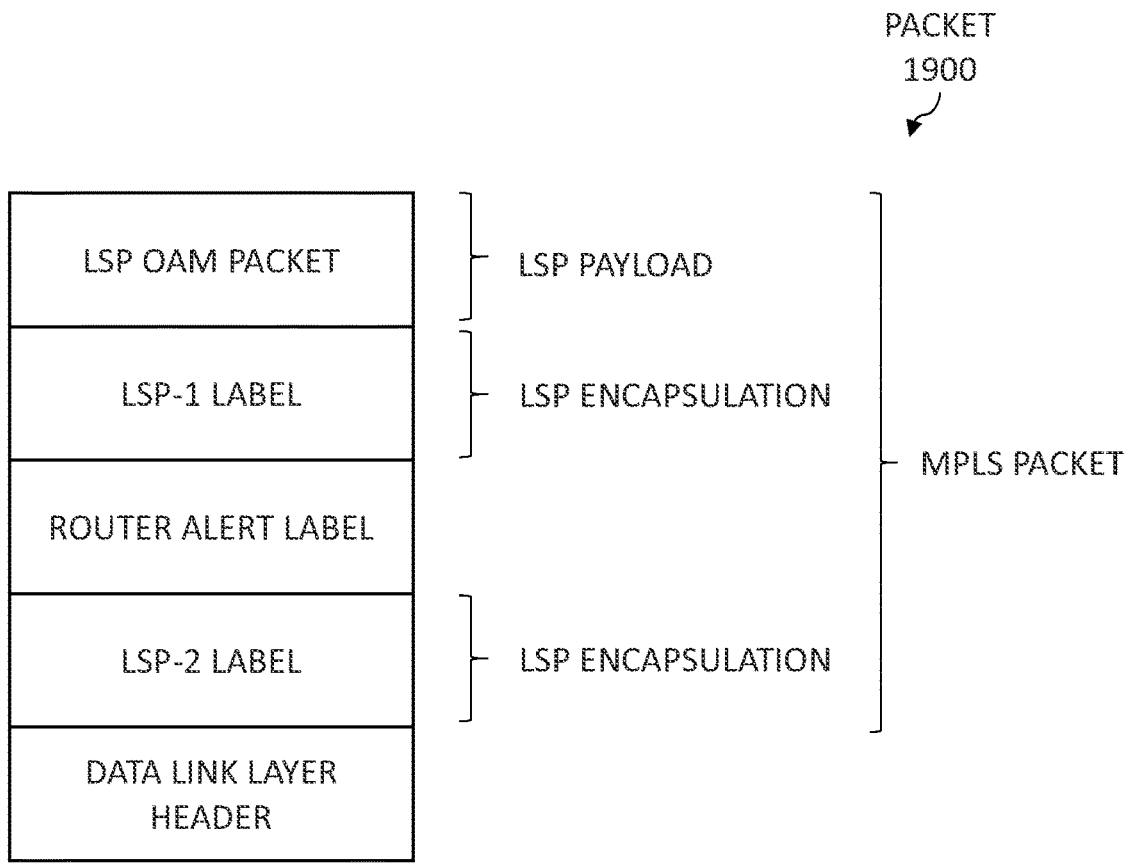
FIG. 19 depicts an example embodiment of a packet including an MPLS packet carrying a LSP OAM packet to be sent over an MPLS LSP-in-LSP.

FIG. 19 depicts an example embodiment of an MPLS packet carrying a LSP OAM packet to be sent over an MPLS LSP-in-LSP. In FIG. 19, the packet 1900 includes an LSP OAM Packet, an LSP-1 Label, a Router Alert Label, an LSP-2 Label, and a Data Link Layer Header. The MPLS packet of FIG. 19 would be the MPLS packet carrying the OAM packet to test LSP-1 of FIG. 18.

Figure 20:
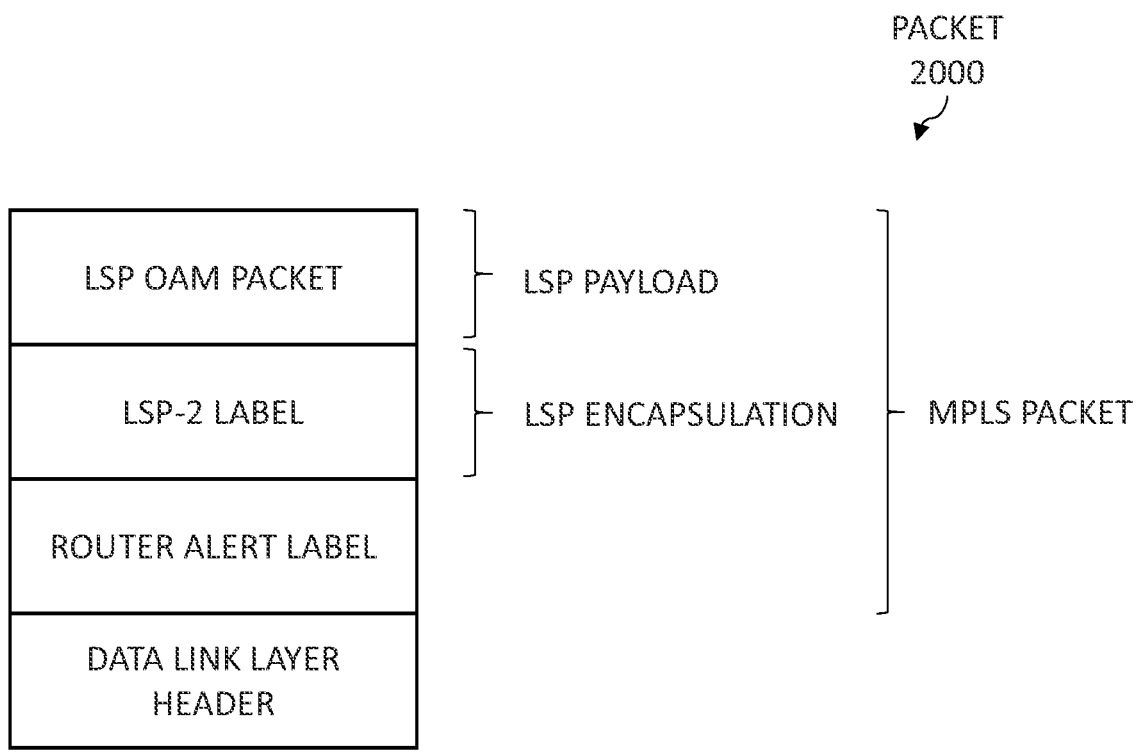
FIG. 20 depicts an example embodiment of a packet including an MPLS packet carrying a LSP OAM packet to be sent over an MPLS LSP.

FIG. 20 depicts an example embodiment of an MPLS packet carrying a LSP OAM packet to be sent over an MPLS LSP. In FIG. 20, the packet 2000 includes an LSP OAM Packet, an LSP-2 Label, a Router Alert Label, and a Data Link Layer Header. The MPLS packet of FIG. 20 would be the MPLS packet carrying the OAM packet to test LSP-2 of FIG. 18, which is similar to the format of FIG. 17.

Figure 21:
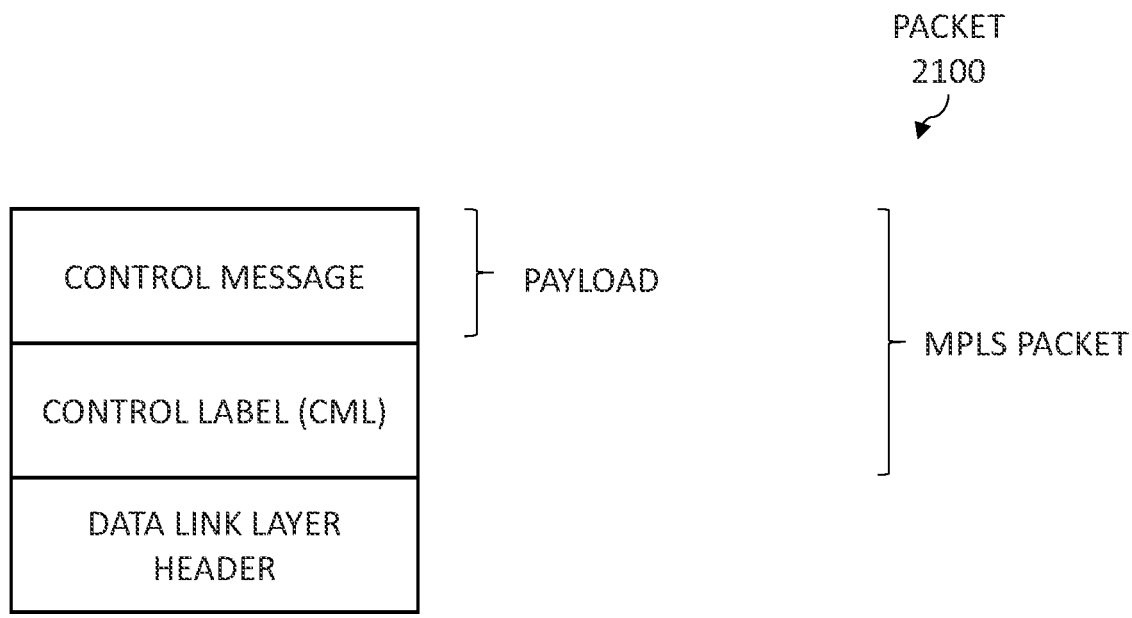
FIG. 21 depicts an example embodiment of a packet including an MPLS packet carrying a control message of a network control protocol.

FIG. 21 depicts an example embodiment of an MPLS packet carrying a control message of a network control protocol. In FIG. 21, the packet 2100 includes a Control Message, a Control Label (CML), and a Data Link Layer Header. The packet 2100 in FIG. 21 is distinguished from the packet in FIG. 16 by the presence of the special Control Label (or CML). It will be appreciated that any suitable value may be reserved for the CML (e.g., 999K or any other suitable value). When a node receives an MPLS packet with a CML, it interprets the Payload as a message for a network control protocol. It will be appreciated that RAL will not be used as the CML since the RAL encoding rule requires that there be at least one more label (of an LSP) beneath RAL. As evident in FIG. 21, there is no context of LSP (or LSP Label) in the packet since the Control Message belongs to an MPLS network control protocol (e.g., network control protocols for topology discovery, routing of paths, signaling of LSPs or OAM between nodes, or the like). In other words, the Control Label provides a Control Channel for the MPLS network, as opposed to the RAL providing a Control Channel for an LSP as in FIG. 17.

Figure 22:
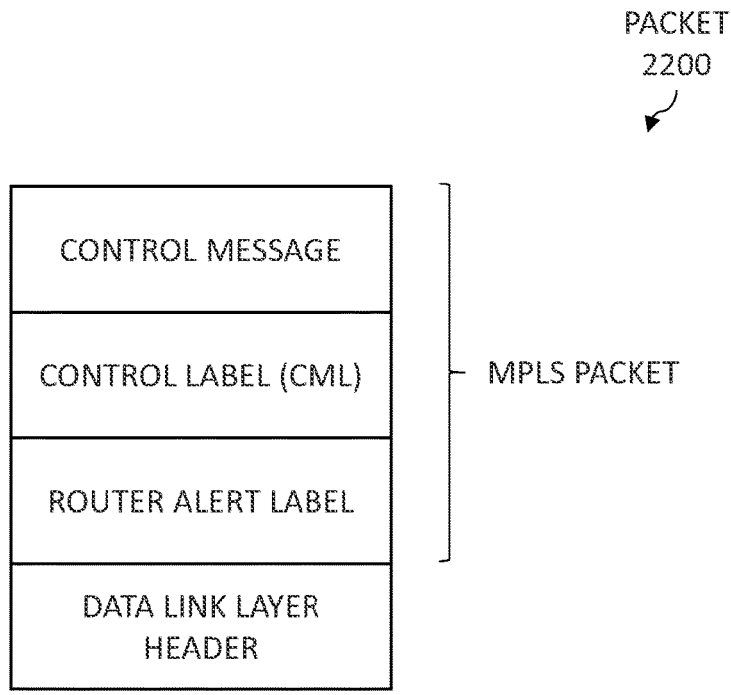
FIG. 22 depicts an example embodiment of a packet including an MPLS packet carrying a control message of a network control protocol.

FIG. 22 depicts an example embodiment of a packet including an MPLS packet carrying a control message of a network control protocol. In FIG. 22, the packet 2200 includes a Control Message, a Control Label (CML), a Router Alert Label, and a Data Link Layer Header. In FIG. 22, RAL is pushed atop CML. For example, one motivation to do this is that some legacy MPLS nodes may require an RAL in their data plane implementation to distinguish an exception packet from a MPLS packet carrying a Data Packet. The formats of the packet 2200 of FIG. 22 and the packet 1700 of FIG. 17 look similar. When a node receives the packet with RAL, it will look for the next label, which is the CML; however, here, the CML is not a LSP label, but, rather, indicates that a network control protocol message is underneath the CML.

Figure 23:
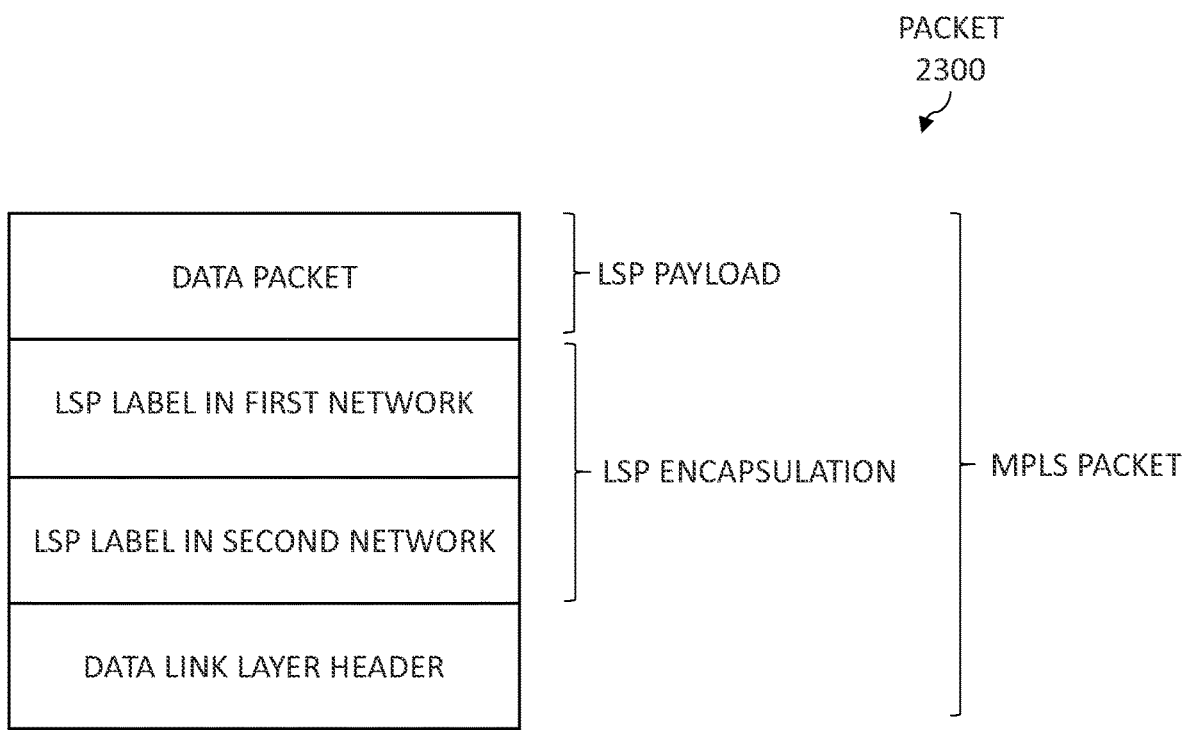
FIG. 23 depicts an example embodiment of a packet including an MPLS packet carrying a control message of a network control protocol for a carrier-in-carrier LSP.

FIG. 23 depicts an example embodiment of a packet including an MPLS packet carrying a control message of a network control protocol for a carrier-in-carrier LSP. In FIG. 23, the packet 2300 includes a Data Packet, an LSP Label in a first network, an LSP Label in a second network, and a Data Link Layer Header. This is the case of carrier-in-carrier MPLS network, where the first MPLS network is overlaid atop a second MPLS network. So, a link in the first MPLS network is emulated by an LSP in the second MPLS network (e.g., a virtual link). It is noted that the format of the packet 2300 of FIG. 23 looks similar to the format of the packet 1800 of FIG. 18; however, the conceptual difference is that in FIG. 18 both LSP-1 and LSP-2 belong to the same network, whereas in FIG. 23 the LSPs belong to different networks.

Figure 24:
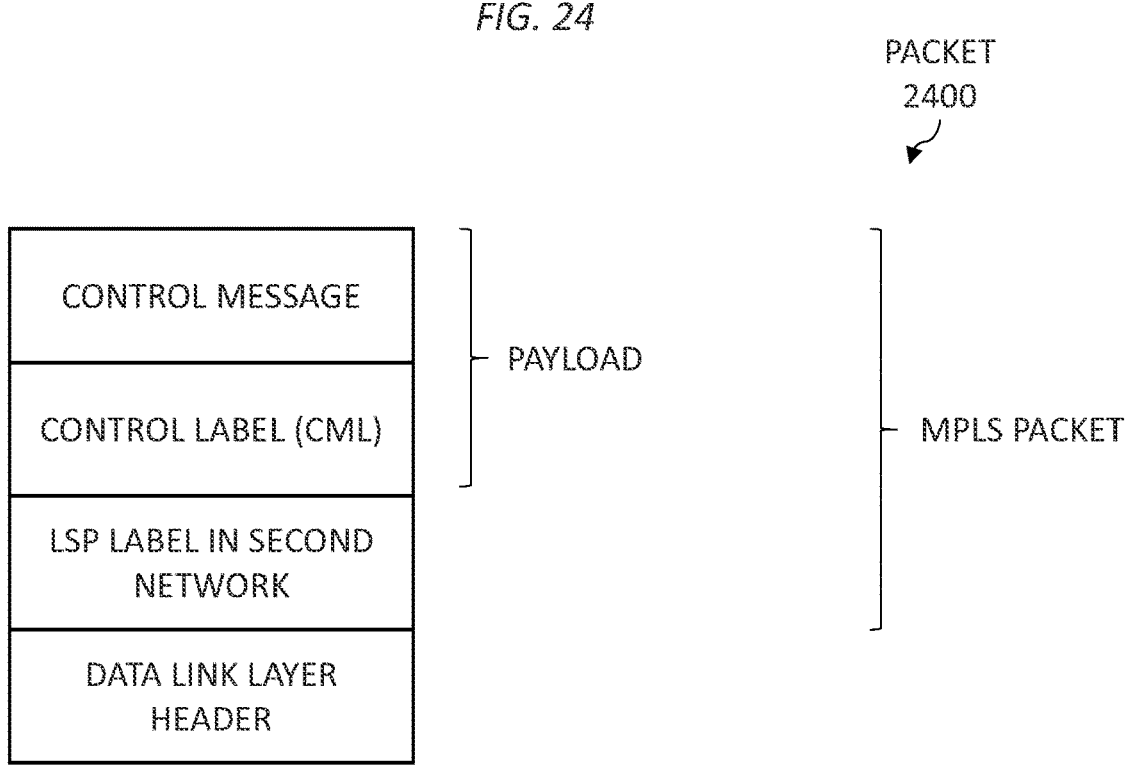
FIG. 24 depicts an example embodiment of a packet including an MPLS packet carrying a control message of a network control protocol for a first network that is transported over a second network.

FIG. 24 depicts an example embodiment of a packet including an MPLS packet carrying a control message of a network control protocol for a first network that is transported over a second network. In FIG. 24, the packet 2400 includes a Control Message, a Control Label (CML), an LSP Label in a second network, and a Data Link Layer Header. This supports operation of an in-band network control protocol in the first MPLS network. The egress node of the LSP in the second network (which is the next-hop for the node in the first network) finds the CML after popping the LSP label. So, the egress node of the LSP in the second network hands over the packet to the module handling the first network, which in turn processes the Control Message for the first network.

Figure 25:
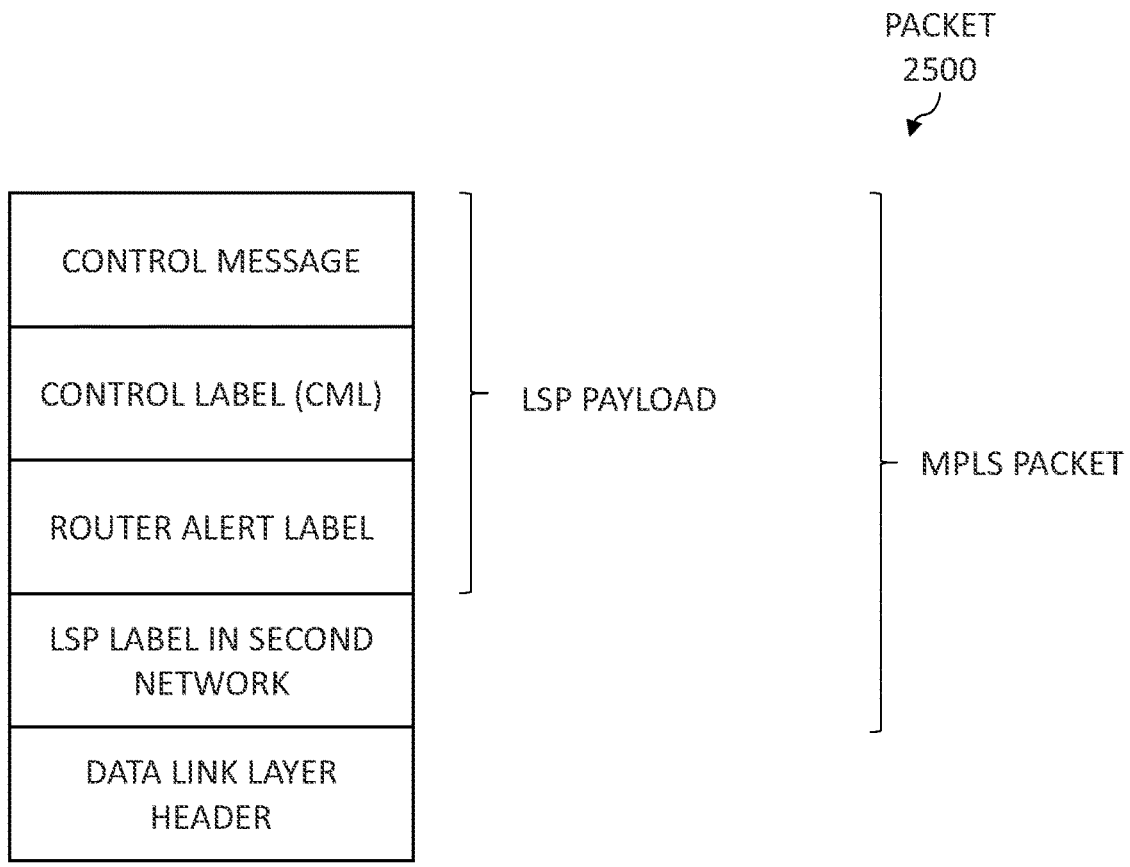
FIG. 25 depicts an example embodiment of a packet including an MPLS packet carrying a control message of a network control protocol for a first network that is transported over a second network.

FIG. 25 depicts an example embodiment of a packet including an MPLS packet carrying a control message of a network control protocol for a first network that is transported over a second network. In FIG. 25, the packet 2500 includes a Control Message, a Control Label (CML), a Router Alert Label, an LSP Label in a second network, and a Data Link Layer Header. When a node receives the packet with RAL, it will look for the next label, which is the CML; however, here, the CML is not a LSP label, but, rather, indicates that a network control protocol message is underneath the CML. This also supports operation of an in-band network control protocol in the first MPLS network. The egress node of the LSP in the second network (which is the next-hop for the node in the first network) finds the CML after popping the LSP label. So, egress node of the LSP in the second network hands over the packet to the module handling the first network, which in turn processes the Control Message for the first network.

It is noted that, in FIG. 24 and FIG. 25, although the {CML, Control Message} is received on an LSP label (of a second network), the tuple has no relation to the LSP Label (meaning that it does not carry control data of the LSP). The format of the packet to operate an in-band network control protocol for the second MPLS network is same as FIG. 21 or FIG. 22.

It is noted that, since various example embodiments presented herein may be applicable to various kinds of MPLS networks in which the Data Link Layer is not present (e.g., DWDM (Lambda Switching), T-MPLS, or the like) or is emulated by some other network, the Data Link Layer Header may be replaced with the header(s) suitable for the media. For example, in T-MPLS, the MPLS packet can be transported transparently over an IP network or another MPLS network, so Data Link Layer Header can be replaced with an IP Header (and layers below) or MPLS labels (and layers below). For example, in case of Lambda Switching, the Data Link Layer Header does not exist (so the MPLS packet portion is directly transmitted on the network) and a label represents a specific Lambda in the optical network. It will be appreciated that various other types of headers may be used for these or various other types of media.

Figure 26:
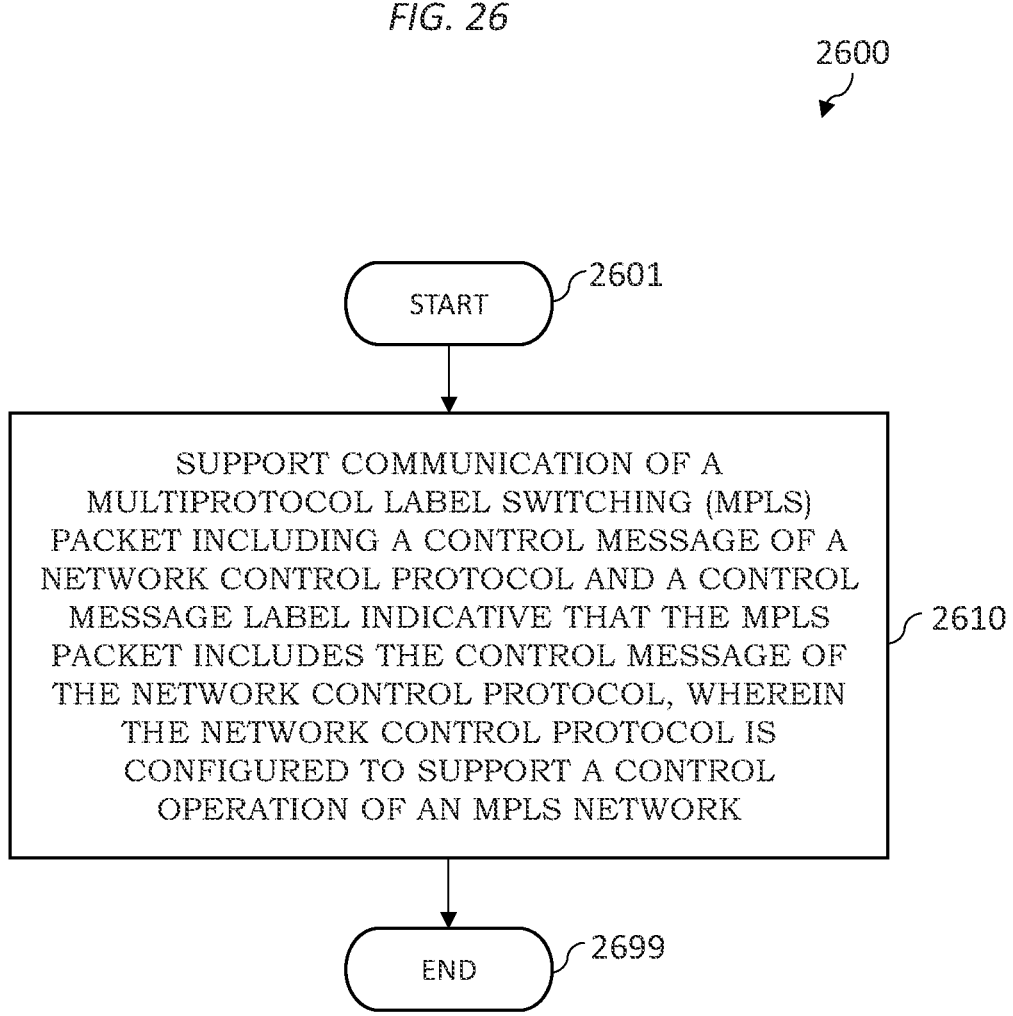
FIG. 26 depicts an example embodiment of a method configured to support an in-band control plane in an MPLS network.

FIG. 26 depicts an example embodiment of a method configured to support an in-band control plane in an MPLS network. It will be appreciated that, although primarily presented herein as being performed serially, at least a portion of the functions of method 2600 may be performed contemporaneously or in a different order than as presented in FIG. 26. At block 2610, support communication of a Multiprotocol Label Switching (MPLS) packet including a control message of a network control protocol and a control message label indicative that the MPLS packet includes the control message of the network control protocol, wherein the network control protocol is configured to support a control operation of an MPLS network. At block 2699, the method 2600 ends.

It will be appreciated that, although various example embodiments for supporting an in-band MPLS control plane are primarily presented herein within the context of an MPLS control plane supporting unicast LSPs, various example for supporting an in-band MPLS control plane also may be applied within the context of an MPLS control plane supporting multicast LSPs (e.g., Point-to-Multipoint (P2MP) LSPs, Multi-Point-to-Multi-Point (MP2MP) LSPs, or the like) based on control protocols configured to support multicast LSPs (e.g., mLDP which is a multipoint extension of LDP, P2MP RSVP-TE which is a multipoint extension of RSVP-TE, or the like).

Various example embodiments for supporting an in-band MPLS control plane may provide various advantages or potential advantages. For example, various example embodiments for supporting an in-band MPLS control plane may be configured to enable TE in the backbone of PBB by enhancing the bridging network with MPLS. For example, various example embodiments for supporting an in-band MPLS control plane may be configured to enable in-band signaling of LSPs in MPLS Transport Profile (MPLS-TP), which eliminates the need for any layer other than MPLS (although it will be appreciated that one or more other layers could be used). For example, various example embodiments for supporting an in-band MPLS control plane may be configured to enable stateful TE in datacenter Ethernet networks by enhancing bridges with MPLS forwarding capabilities. For example, various example embodiments for supporting an in-band MPLS control plane may be configured to enable signaling of Generalized MPLS (GMPLS) LSPs using the GMPLS data plane itself, thereby obviating the need for use of an IP-based control plane (e.g., RSVP-TE, OSPF, or the like) to support interoperability of GMPLS with optical switches as implementation of an IP-based control plane in an optical switch may not be ideal (e.g., it may not be a good fit, it may increase cost, and so forth). Various example embodiments for supporting an in-band control plane may provide various other advantages or potential advantages.

Figure 27:
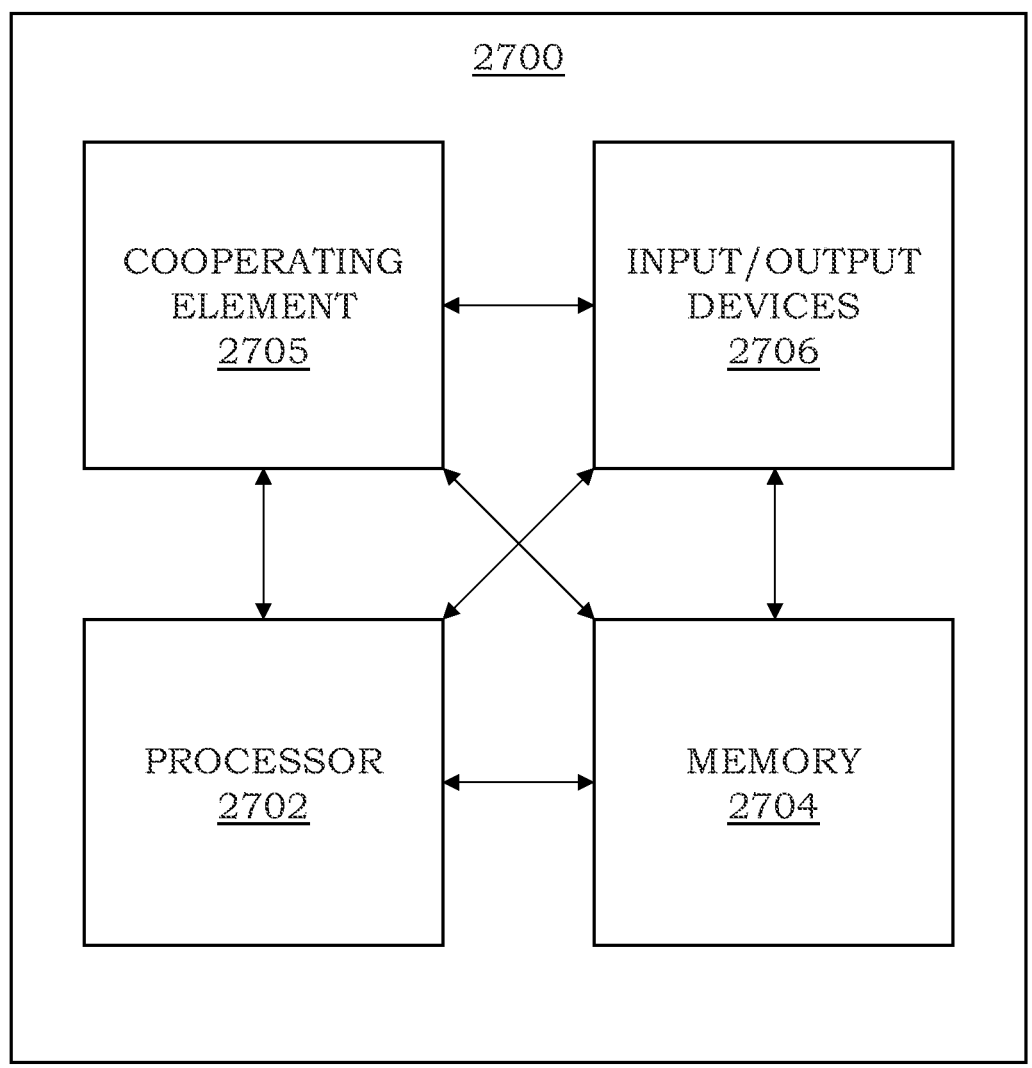
FIG. 27 depicts an example embodiment of a computer suitable for use in performing various functions presented herein.

FIG. 27 depicts an example embodiment of a computer suitable for use in performing various functions presented herein.

The computer 2700 includes a processor 2702 (e.g., a central processing unit (CPU), a processor, a processor having a set of processor cores, a processor core of a processor, or the like) and a memory 2704 (e.g., a random access memory, a read only memory, or the like). The processor 2702 and the memory 2704 may be communicatively connected. In at least some example embodiments, the computer 2700 may include at least one processor and at least one memory including computer program code, wherein the computer program code is configured to, when executed by the at least one processor, cause the computer to perform various functions presented herein.

The computer 2700 also may include a cooperating element 2705. The cooperating element 2705 may be a hardware device. The cooperating element 2705 may be a process that can be loaded into the memory 2704 and executed by the processor 2702 to implement various functions presented herein (in which case, for example, the cooperating element 2705 (including associated data structures) can be stored on a non-transitory computer-readable storage medium, such as a storage device or other suitable type of storage element (e.g., a magnetic drive, an optical drive, or the like)).

The computer 2700 also may include one or more input/output devices 2706. The input/output devices 2706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 2700 may represent a general architecture and functionality suitable for implementing functional elements described herein, portions of functional elements described herein, or the like, as well as various combinations thereof. For example, computer 2700 may provide a general architecture and functionality that is suitable for implementing one or more elements presented herein, such as node or a portion thereof, a controller or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including instructions which, when executed by the at least one processor, cause the apparatus at least to:
   support communication of a Multiprotocol Label Switching (MPLS) packet in an MPLS network;
   wherein the MPLS packet includes a control message of a network control protocol, wherein the network control protocol is configured to support a control operation of the MPLS network, wherein the control message of the network control protocol includes a protocol message of the network control protocol and an indication of the network control protocol;
   wherein the MPLS packet includes a control message label encapsulating the control message of the network control protocol, wherein the control message label is indicative that the MPLS packet includes the control message of the network control protocol;
   wherein the MPLS packet includes a router alert label encapsulating the control message label and the control message of the network control protocol;
   wherein, to support communication of the MPLS packet, the instructions, when executed by the at least one processor, cause the apparatus at least to:

receive, by a node, the MPLS packet;
determine, by the node based on the router alert label, to provide the control message label and the control message of the network control protocol to a local module of the node for processing;
determine, by the node based on the control message label, that the control message label encapsulates the control message of the network control protocol; and
process, by the node, the control message of the network control protocol.

2. The apparatus of claim 1, wherein the network control protocol includes a routing protocol configured for topology discovery and path computation in the MPLS network.

3. The apparatus of claim 1, wherein the network control protocol includes a signaling protocol configured for setting up label switched paths (LSPs) in the MPLS network.

4. The apparatus of claim 1, wherein the network control protocol includes an operations, administration, and maintenance (OAM) protocol configured to support OAM functions in the MPLS network.

5. The apparatus of claim 1, wherein the network control protocol is configured to use an addressing scheme to identify a set of network elements of the MPLS network based on a type of the MPLS network.

6. The apparatus of claim 5, wherein a label is used as an address to identify one of the network elements of the MPLS network.

7. The apparatus of claim 1, wherein the control message label is an MPLS label.

8. The apparatus of claim 1, wherein the control message of the network control protocol includes a protocol type field including the indication of the network control protocol and a protocol message field including the protocol message of the network control protocol.

9. The apparatus of claim 1, wherein the control message of the network control protocol includes a protocol type field including the indication of the network control protocol, a data length field, and a protocol message field including the protocol message of the network control protocol.

10. The apparatus of claim 9, wherein the control message of the network control protocol includes a user data packet, wherein the data length field is encoded with a value indicative that the control message of the network control protocol includes the user data packet.

11. The apparatus of claim 1, wherein the protocol message of the network control protocol is encoded using a node identifier field, a message identifier field, a message length field, a message type field, and a message data field.

12. The apparatus of claim 1, wherein the MPLS packet includes a data packet.

13. The apparatus of claim 12, wherein the data packet is configured to trigger setup of a label switched path (LSP) and the control message of the network control protocol is configured for setting up the LSP.

14. The apparatus of claim 12, wherein the MPLS packet includes a payload, wherein the payload includes the control message of the network control protocol and the data packet.

15. The apparatus of claim 1, wherein the MPLS packet is encapsulated by a data link layer header.

16. The apparatus of claim 1, wherein the MPLS packet includes an LSP label in a second MPLS network, wherein the LSP label in the second MPLS network encapsulates the router alert label, the control message label, and the control message of the network control protocol.

17. The apparatus of claim 1, wherein the MPLS network includes at least one of an MPLS-based Ethernet bridging network, an MPLS-Transport Profile (MPLS-TP) network, or a Generalized MPLS (GMPLS) network.

18. A method, comprising:
supporting communication of a Multiprotocol Label Switching (MPLS) packet in an MPLS network;
wherein the MPLS packet includes a control message of a network control protocol, wherein the network control protocol is configured to support a control operation of the MPLS network, wherein the control message of the network control protocol includes a protocol message of the network control protocol and an indication of the network control protocol;
wherein the MPLS packet includes a control message label encapsulating the control message of the network control protocol, wherein the control message label is indicative that the MPLS packet includes the control message of the network control protocol;
wherein the MPLS packet includes a router alert label encapsulating the control message label and the control message of the network control protocol;
wherein supporting communication of the MPLS packet comprises:
receiving, by a node, the MPLS packet;
determining, by the node based on the router alert label, to provide the control message label and the control message of the network control protocol to a local module of the node for processing;
determining, by the node based on the control message label, that the control message label encapsulates the control message of the network control protocol; and
processing, by the node, the control message of the network control protocol.

19. An apparatus, comprising:
at least one processor; and
at least one memory including instructions which, when executed by the at least one processor, cause the apparatus at least to:
receive, by a node, a Multiprotocol Label Switching (MPLS) packet including a control message of a network control protocol, a control message label indicative that the MPLS packet includes the control message of the network control protocol, and a router alert label, wherein the network control protocol is configured to support a control operation of an MPLS network, wherein the control message of the network control protocol includes an indication of the network control protocol and a protocol message of the network control protocol, wherein the control message label encapsulates the control message of the network control protocol, wherein the router alert label encapsulates the control message label and the control message of the network control protocol;
determine, by the node based on the router alert label, to provide the control message label and the control message of the network control protocol to a local module of the node for processing;
determine, by the node based on the control message label, to process the control message of the network control protocol;
determine, by the node based on the indication of the network control protocol in the control message, the network control protocol; and
process, by the node based on the network control protocol, the protocol message of the network control protocol.

* * * * *